United States Patent
Hayashi

(10) Patent No.: US 8,049,798 B2
(45) Date of Patent: Nov. 1, 2011

(54) IMAGING DEVICE AND IMAGE PROCESSING METHOD

(75) Inventor: Yuusuke Hayashi, Tokyo (JP)

(73) Assignee: Kyocera Corporation, Kyoto (JP)

( * ) Notice: Subject to any disclaimer, the term of this patent is extended or adjusted under 35 U.S.C. 154(b) by 553 days.

(21) Appl. No.: 12/159,593

(22) PCT Filed: Dec. 13, 2006

(86) PCT No.: PCT/JP2006/324857
§ 371 (c)(1),
(2), (4) Date: Feb. 27, 2009

(87) PCT Pub. No.: WO2007/074649
PCT Pub. Date: Jul. 5, 2007

(65) Prior Publication Data
US 2009/0303355 A1 Dec. 10, 2009

(30) Foreign Application Priority Data
Dec. 27, 2005 (JP) .................. 2005-376664

(51) Int. Cl.
*H04N 5/335* (2011.01)
*H04N 5/238* (2006.01)

(52) U.S. Cl. ...................................... 348/294; 348/363

(58) Field of Classification Search ............. 348/240.99, 348/240.3, 294, 335, 340, 362, 363
See application file for complete search history.

(56) References Cited

U.S. PATENT DOCUMENTS

| 6,021,005 A | 2/2000 | Cathey, Jr. et al. ............ 359/737 |
| 6,069,738 A | 5/2000 | Cathey, Jr. et al. ............ 359/558 |
| 6,525,302 B2 | 2/2003 | Dowski, Jr. et al. ........ 250/201.1 |

(Continued)

FOREIGN PATENT DOCUMENTS

JP 2000-098301 4/2000
(Continued)

OTHER PUBLICATIONS

English translation of Written Opinion of the International Search Authority (PCT/ISA/237) for prepared for PCT/JP2006/324857, Jun. 27, 2008.*

*Primary Examiner* — David N Spector
(74) *Attorney, Agent, or Firm* — DLA Piper LLP (US)

(57) ABSTRACT

An imaging device able to simplify an optical system, able to reduce costs, and in addition capable of giving a restored image having a suitable quality in accordance with stop control and having a small influence of noise, and an image processing method of same, including an optical system 110 and an imaging element 120 forming a first order image and an image processing device 150 forming the first order image to a high definition last image, wherein a control device 200 detects stop information and controls a switching unit 140 so as to input a dispersed image signal of an object captured by the imaging element 120 via an AFE 130 to the image processing device 150 and input a dispersion-free restored image signal to a camera signal processing unit 160 when not closing the stop down to a predetermined value, while directly input the dispersed image signal of the object captured by the imaging element 120 via the AFE 130 to the camera signal processing unit 160 without passing through the image processing device 150 when closing the stop down to the predetermined value or more.

23 Claims, 25 Drawing Sheets

U.S. PATENT DOCUMENTS

| | | | |
|---|---|---|---|
| 6,642,504 B2 | 11/2003 | Cathey | 250/216 |
| 6,984,206 B2 | 1/2006 | Kumei | |
| 7,944,490 B2 * | 5/2011 | Hayashi | 348/294 |
| 2010/0310246 A1 * | 12/2010 | Campbell | 396/89 |

FOREIGN PATENT DOCUMENTS

| | | |
|---|---|---|
| JP | 2003-235794 | 8/2003 |
| JP | 2004-153497 | 5/2004 |
| JP | 2004-328506 | 11/2004 |

* cited by examiner

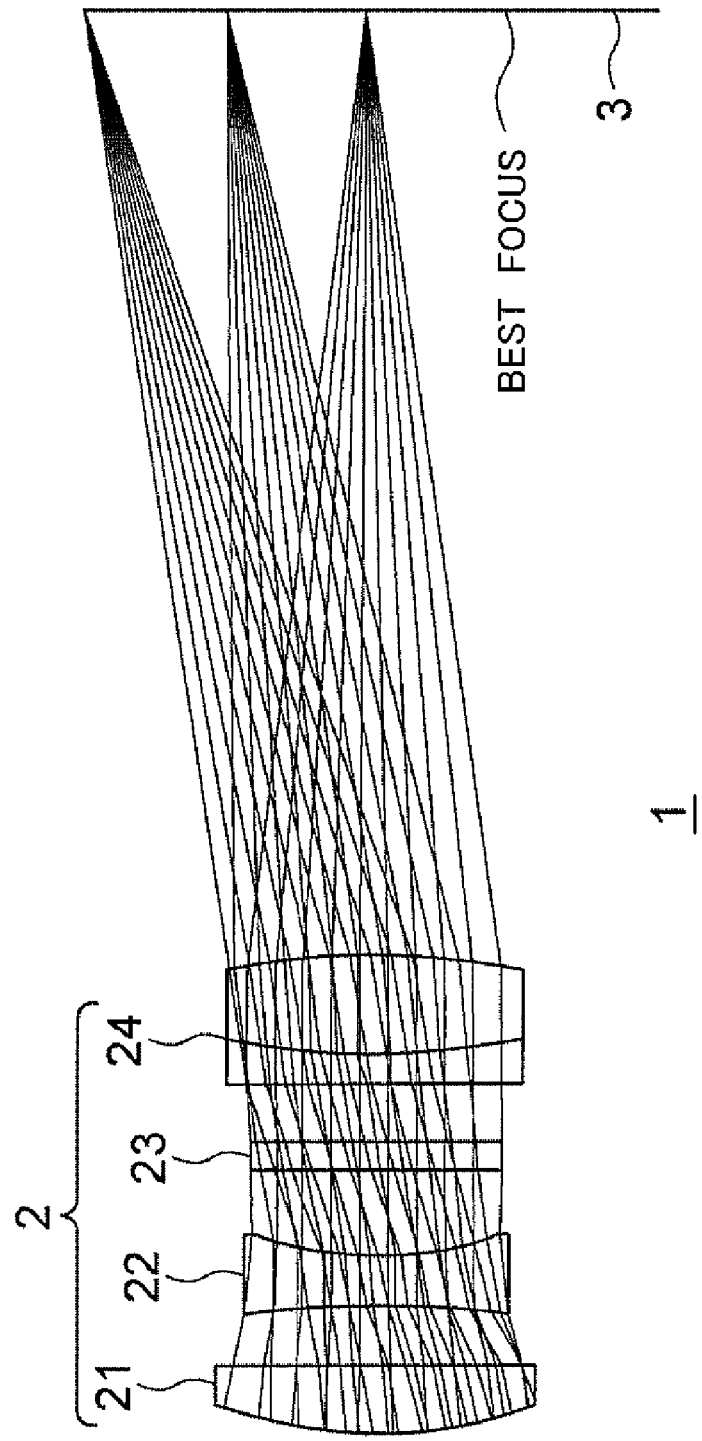

SPOT IMAGES OF OPTICAL SYSTEM

FIELD( 0.000, 0.000)

DEFOCUS = 0.2mm 0.4000(mm)
CENTER OF GRAVITY ( 0.0000, 0.0000)

FIELD( 0.000, 0.000)

BEST FOCUS 0.4000(mm)
CENTER OF GRAVITY ( 0.0000, 0.0000)

FIELD( 0.000, 0.000)

DEFOCUS = −0.2mm 0.4000(mm)
CENTER OF GRAVITY ( 0.0000, 0.0000)

WIDE ANGLE SIDE

TELESCOPIC SIDE

DEFOCUS = 0.2mm

FIELD(0.000, 0.000)

100.00

BEST FOCUS

FIELD(0.000, 0.000)

100.00

DEFOCUS = −0.2mm

FIELD(0.000, 0.000)

EXAMPLE OF KERNEL DATA STORAGE ROM

| OPTICAL MAGNIFICATION | ×1.5 | ×5 | ×10 |
|---|---|---|---|
| KERNEL DATA | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

FIG. 20

EXAMPLE OF KERNEL TABLE

| STOP | F2.8 | F4 |
|---|---|---|
| KERNEL | A | B |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

FIG. 21

EXAMPLE OF KERNEL TABLE

| OBJECT DISTANCE INFORMATION | 100mm | 500mm | 4m |
|---|---|---|---|
| KERNEL | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

FILTER STRUCTURE

IMAGING DEVICE AND IMAGE PROCESSING METHOD

TECHNICAL FIELD

The present invention relates to a digital still camera, a camera mounted in a mobile phone, a camera mounted in a personal digital assistant, an image checking device, an automatic control use industrial camera, or other imaging device using an imaging element and having an optical system.

BACKGROUND ART

In recent years, rapid advances have been made in digitalization of information. This has led to remarkable efforts to meet with this in the imaging field.

In particular, as symbolized by the digital camera, in the imaging surfaces, conventional film is being taken over by use of solid-state imaging elements such as CCDs (charge coupled devices) or CMOS (complementary metal oxide semiconductor) sensors in most cases.

An imaging lens device using a CCD or CMOS sensor for the imaging element in this way optically captures the image of an object by the optical system and extracts the content as an electric signal by the imaging element. Other than a digital still camera, this is used in a video camera, a digital video unit, a personal computer, a mobile phone, a personal digital assistant (PDA), an image checking device, an automatic control use industrial camera, and so on.

FIG. 1 is a diagram schematically showing the configuration of a general imaging lens device and a state of light rays.

This imaging lens device 1 has an optical system 2 and a CCD or CMOS sensor or other imaging element 3.

The optical system includes object side lenses 21 and 22, a stop 23, and an imaging lens 24 sequentially arranged from the object side (OBJS) toward the imaging element 3 side.

In the imaging lens device 1, as shown in FIG. 1, the best focus plane is made to match with the imaging element surface.

FIG. 2A to FIG. 2C show spot images on a light receiving surface of the imaging element 3 of the imaging lens device 1.

Further, imaging devices using phase plates (wavefront coding optical elements) to regularly disperse the light rays, using digital processing to restore the image, and thereby enabling capture of an image having a deep depth of field and so on have been proposed (see for example Non-patent Documents 1 and 2 and Patent Documents 1 to 5).

Further, an automatic exposure control system of a digital camera performing filtering using a transfer function has been proposed (see for example Patent Document 6).

Non-patent Document 1: "Wavefront Coding; jointly optimized optical and digital imaging systems", Edward R. Dowski, Jr., Robert H. Cormack, Scott D. Sarama.

Non-patent Document 2: "Wavefront Coding; A modern method of achieving high performance and/or low cost imaging systems", Edward R. Dowski, Jr., Gregory E. Johnson.

Patent Document 1: U.S. Pat. No. 6,021,005
Patent Document 2: U.S. Pat. No. 6,642,504
Patent Document 3: U.S. Pat. No. 6,525,302
Patent Document 4: U.S. Pat. No. 6,069,738
Patent Document 5: Japanese Patent Publication (A) No. 2003-235794
Patent Document 6: Japanese Patent Publication (A) No. 2004-153497

DISCLOSURE OF THE INVENTION

Problem to be Solved by the Invention

All of the imaging devices proposed in the documents explained above are predicated on a PSF (Point-Spread-Function) being constant when inserting the above phase plate in the usual optical system. If the PSF changes, it is extremely difficult to realize an image having a deep depth of field by convolution using the subsequent kernels.

Accordingly, leaving aside the case of lenses with a single focal point, in lenses of a zoom system, AF system, etc., the high level of precision of the optical design thereof and the accompanying increase in costs cause major problems in adoption of this.

In other words, in the general imaging device explained above, suitable convolution operation is not possible. An optical design eliminating the astigmatism, coma aberration, zoom chromatic aberration, and other aberration causing deviation of the spot image at the time of the "wide" mode and at the time of the "tele" mode is required.

However, optical design eliminating these aberrations increases the difficulty of the optical design and induces problems such as an increase of the number of design processes, an increase of the costs, and an increase in size of the lenses.

Further, in the device disclosed in each document explained above, when for example capturing an image in a dark place and restoring the image by signal processing, noise is simultaneously amplified as well.

Accordingly, in an optical system including an optical system and signal processing that uses for example the above-mentioned phase plate or other optical wavefront modulation element and signal processing after that, there is the disadvantage that when a capturing an image in a dark place, noise is amplified and has an effect on the restored image.

Further, with the above technique, in for example capturing a bright object, if closing down the stop, the phase modulation element is covered by the stop. Therefore there is the disadvantage that the phase change becomes small, so this exerts an influence upon the restored image when performing image restoration processing.

The present invention provides an imaging device able to simplify the optical system, able to reduce costs, and in addition able to give a restored image having a suitable quality in accordance with stop control and having a small influence of noise and an image processing method of the same.

Means for Solving the Problem

An imaging device of an aspect of the present invention has an optical system, an optical wavefront modulation element modulating an optical transfer function (OTF), a variable stop, an imaging element capturing an object image passed through the optical system, the variable stop, and the optical wavefront modulation element, a converting means for generating a dispersion-free image signal from a dispersed image signal of the object from the imaging element, a signal processing unit performing predetermined processing on the image signal, a memory means for storing operation coefficients of the signal processing unit, and a control means for controlling the stop, wherein the control means, when not closing the stop down to a predetermined value, inputs the dispersed image signal of the object from the imaging element to the converting means and inputs the dispersion-free image signal to the signal processing unit and, when closing the stop down to the predetermined value or more, inputs the dispersed image signal of the object from the imaging element to the signal processing unit without passing through the converting means.

Preferably, the optical wavefront modulation element has the action of making the change of the OTF in accordance with the object distance smaller than that of an optical system not having an optical wavefront modulation element.

Preferably, the OTF of the optical system having the optical wavefront modulation element is 0.1 or more up to the Nyquist frequency of the imaging element over an object distance broader than the depth of the field of the object of an optical system not including an optical wavefront modulation element.

Preferably, in the optical wavefront modulation element, the phase is represented by the following equation where an optical axis of the optical system is a z-axis, and two axes perpendicular to each other are x and y.

$$z = \exp\left\{i \times \left(\sum_{j=1} C_j x^m y^n\right)\right\}$$ [Equation 1]

where, n and m are integers, $j=[(m+n)2+m+3n]/2$, $|x|\leq 1$, and $|y|\leq 1$.

Preferably, the signal processing unit has a means for applying noise reduction filtering.

Preferably, the memory means stores operation coefficients for the noise reduction processing in accordance with the exposure information.

Preferably, the memory means stores operation coefficients for the optical transfer function (OTF) restoration in accordance with the exposure information.

Preferably, as the exposure information, stop information is included.

Preferably, the imaging device is provided with an object distance information generating means for generating information corresponding to the distance up to the object, and the converting means generates a dispersion-free image signal from the dispersed signal of the object based on the information generated by the object distance information generating means.

Preferably, the imaging device is provided with a conversion coefficient storing means for storing at least two or more conversion coefficients corresponding to the dispersion caused by the optical wavefront modulation element or the optical system in accordance with the object distance and a coefficient selecting means for selecting the conversion coefficient in accordance with the distance up to the object from the conversion coefficient storing means based on the information generated by the object distance information generating means, and the converting means converts the image signal according to the conversion coefficient selected at the coefficient selecting means.

Preferably, the imaging device is provided with a conversion coefficient operation means for performing operation of the conversion coefficient based on the information generated by the object distance information generating means, and the converting means converts the image signal according to the conversion coefficient obtained from the conversion coefficient operation means.

Preferably, in the imaging device, the optical system includes a zoom optical system, and the device is provided with a correction value storing means for storing in advance at least one or more correction values in accordance with the zoom position or zoom amount of the zoom optical system, a second conversion coefficient storing means for storing in advance at least the conversion coefficient corresponding to the dispersion caused by the optical wavefront modulation element or the optical system, and a correction value selecting means for selecting the correction value in accordance with the distance up to the object from the correction value storing means based on the information generated by the object distance information generating means, and the converting means converts the image signal according to the conversion coefficient obtained from the second conversion coefficient storing means and the correction value selected from the correction value selecting means.

Preferably, the correction value stored by the correction value storing means includes a kernel size of the dispersed image of the object.

Preferably, the imaging device is provided with an object distance information generating means for generating the information corresponding to the distance up to the object and a conversion coefficient operation means for performing operation of the conversion coefficient based on the information generated by the object distance information generating means, and the converting means converts the image signal and generates a dispersion-free image signal based on the conversion coefficient obtained from the conversion coefficient operation means.

Preferably, the conversion coefficient operation means includes a kernel size of the dispersed image of the object as a variable.

Preferably, the device has a storing means, the conversion coefficient operation means stores the found conversion coefficient in the storing means, and the converting means converts the image signal and generates a dispersion-free image signal according to the conversion coefficient stored in the storing means.

Preferably, the converting means performs a convolution operation based on the conversion coefficient.

Preferably, the imaging device is provided with an image capturing mode setting means for setting an image capturing mode of the object to be captured, and the converting means performs different conversion processing in accordance with the image capturing mode set by the image capturing mode setting means.

Preferably, the image capturing mode includes, other than a normal image capturing mode, at least one of a macro image capturing mode or a distant view image capturing mode, when the image capturing mode includes the macro image capturing mode, the converting means selectively executes normal conversion processing in the normal image capturing mode and macro conversion processing for reducing dispersion at a proximate side in comparison with the normal conversion processing in accordance with the image capturing mode, and when the image capturing mode includes the distant view image capturing mode, the converting means selectively executes normal conversion processing in the normal image capturing mode and distant view conversion processing for reducing dispersion at a distant side in comparison with the normal conversion processing in accordance with the image capturing mode.

Preferably, the device is further provided with a conversion coefficient storing means for storing a different conversion coefficient in accordance with each image capturing mode set by the image capturing mode setting means and a conversion coefficient extracting means for extracting a conversion coefficient from the conversion coefficient storing means in accordance with the image capturing mode set by the image capturing mode setting means, and the converting means converts the image signal according to the conversion coefficient obtained from the conversion coefficient extracting means.

Preferably, the conversion coefficient storing means includes the kernel size of the dispersed image of the object as the conversion coefficient.

Preferably, the image capturing mode setting means includes an operation switch for inputting the image capturing mode and an object distance information generating means for generating information corresponding to a distance up to the object according to the input information of the operation switch, and the converting means converts a dispersed image signal to a dispersion-free image signal based on the information generated by the object distance information generating means.

A second aspect of the present invention is an image processing method of an imaging device having an optical system, a variable stop, and an imaging element for capturing an object image passed through the optical wavefront modulation element, comprising the steps of, when not closing the stop down to a predetermined value, generating a dispersion-free image signal from a dispersed image signal of the object from the imaging element and performing predetermined signal processing with respect to the dispersion-free image signal and, when closing the stop down to the predetermined value or more, performing predetermined signal processing with respect to the dispersed image signal of the object from the imaging element.

Effect of the Invention

According to the present invention, there are the advantages that the optical system can be simplified, costs can be reduced, and in addition a restored image having a suitable image quality in accordance with the stop control and having a small influence of the noise can be obtained.

BRIEF DESCRIPTION OF THE DRAWINGS

FIG. 1 is a diagram schematically showing the configuration of a general imaging lens device and a state of light rays.

FIG. 2A to FIG. 2C are diagrams showing spot images on a light receiving surface of an imaging element of an imaging lens device, in which FIG. 2A is a diagram showing a spot image in a case where a focal point is deviated by 0.2 mm (defocus=0.2 mm), FIG. 2B is a diagram showing a spot image in a case of focus (best focus), and FIG. 2C is a diagram showing a spot image in a case where the focal point is deviated by −0.2 mm (defocus=−0.2 mm).

FIG. 10A to FIG. 10C are diagrams showing spot images on the light receiving surface of the imaging element according to the present embodiment, in which FIG. 10A is a diagram showing a spot image in the case where the focal point is deviated by 0.2 mm (defocus=0.2 mm), FIG. 10B is a diagram showing a spot image in the case of focus (best focus), and FIG. 10C is a diagram showing a spot image in the case where the focal point is deviated by −0.2 mm (defocus=−0.2 mm).

FIG. 11A and FIG. 11B are diagrams for explaining an MTF of a first order image formed by the imaging element according to the present embodiment, in which FIG. 11A is a diagram showing a spot image on the light receiving surface of the imaging element of the imaging lens device, and FIG. 11B shows an MTF characteristic with respect to a spatial frequency.

FIG. 19 is a diagram showing an example of storage data of a kernel data ROM (optical magnification).

FIG. 20 is a diagram showing another example of storage data of the kernel data ROM (F number).

FIG. 21 is a diagram showing another example of storage data of the kernel data ROM (F number).

DESCRIPTION OF NOTATIONS

100 . . . imaging device, 110 . . . optical system, 120 . . . imaging element, 130 . . . analog front end unit (AFE), 140 . . . switching unit, 140 . . . switching unit, 150 . . . image processing device, 160 . . . camera signal processing unit, 190 . . . operating unit, 200 . . . control device, 111 . . . object side lens, 112 . . . focus lens, 113 . . . wavefront forming optical element, 113a . . . phase plate (optical wavefront modulation element), 152 . . . convolution operation unit, 153 . . . kernel data ROM, and 154 . . . convolution control unit.

BEST MODE FOR CARRYING OUT THE INVENTION

Below, embodiments of the present invention will be explained with reference to the accompanying drawings.

Figure 2A:
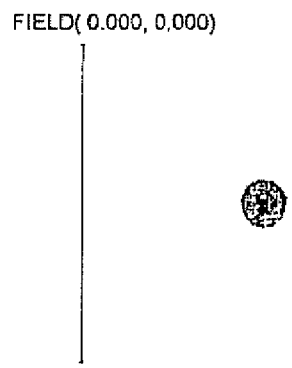
Figure 2B:
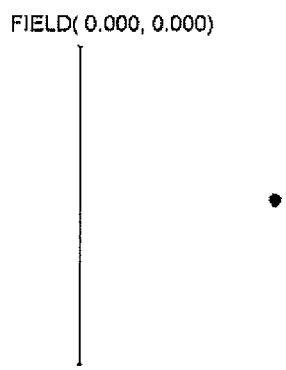
Figure 2C:
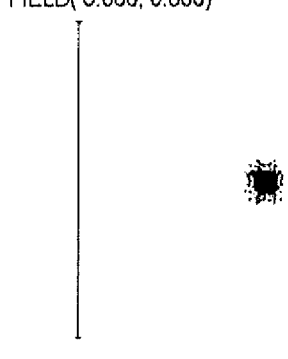
Figure 3:
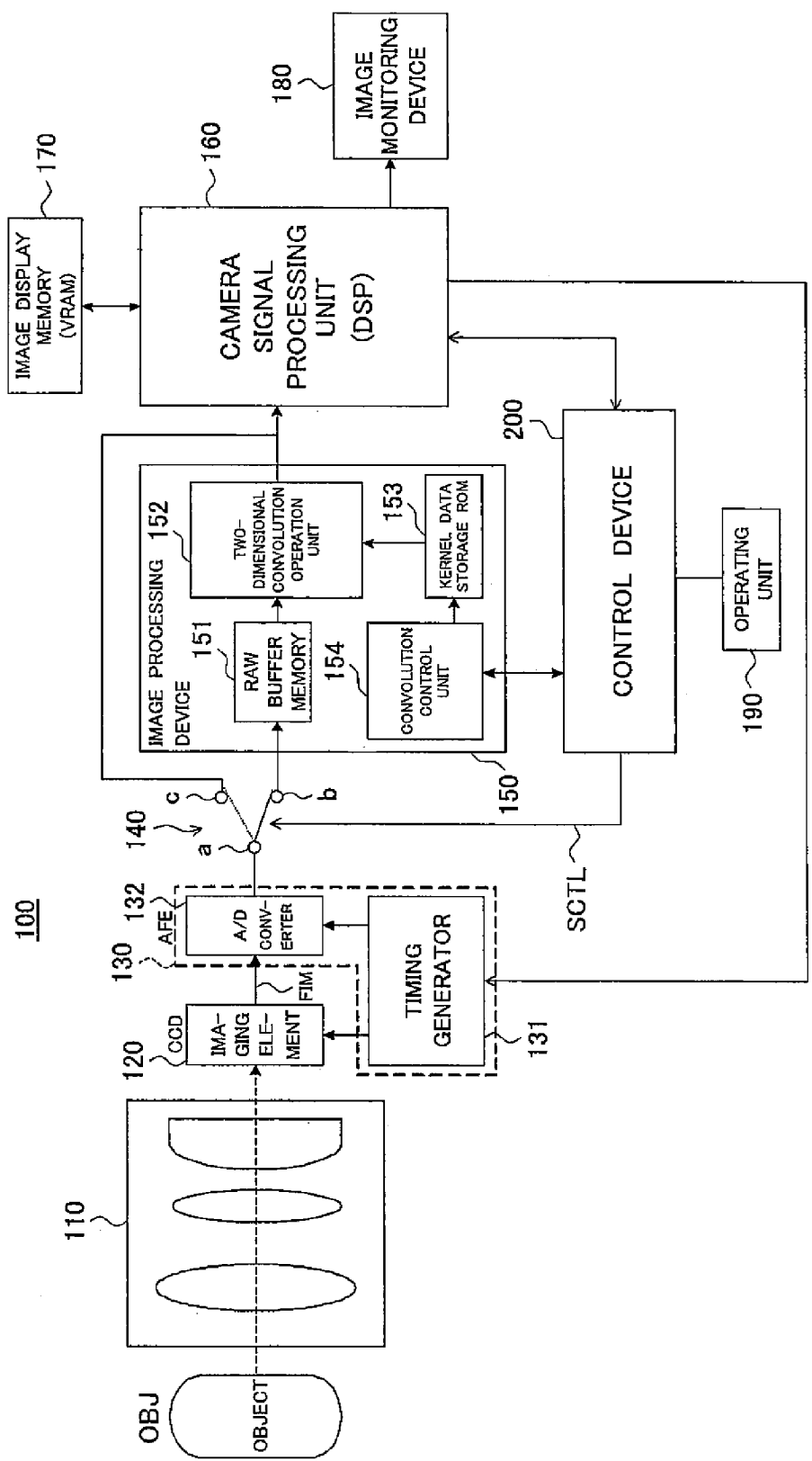
FIG. 3 is a block diagram showing the configuration of an embodiment of an imaging device according to the present invention.

FIG. 3 is a block diagram showing the configuration of an imaging device according to a first embodiment of the present invention.

An imaging device 100 according to the present embodiment has an optical system 110, imaging element 120, analog front end unit (AFE) 130, switching unit 140, image processing device 150, camera signal processing unit 160, image display memory 170, image monitoring device 180, operating unit 190, control device 200, and variable stop 210.

The optical system 110 supplies an image capturing an object OBJ to the imaging element 120.

The imaging element 120 is configured by a CCD or CMOS sensor in which the image fetched at the optical system 110 is formed and which outputs a formed first order image information as a first order image signal FIM of an electric signal via the analog front end unit 130 to the image processing device 150.

In FIG. 3, the imaging element 120 is described as a CCD as an example.

The analog front end unit 130 has a timing generator 131 and an analog/digital (A/D) converter 132.

The timing generator 131 generates a drive timing of the CCD of the imaging element 120, and the A/D converter 132 converts the analog signal input from the CCD to a digital signal which it outputs to the image processing device 150.

The switching unit 140 selectively inputs the captured image signal of the imaging element 120 via the AFE 130 to the image processing device 150 or camera signal processing unit 160 in accordance with a switch control signal SCTL from the control device 200.

In the switching unit 140, a fixed contact a is connected to an output line of the A/D converter 132 of the AFE 130, a working contact b is connected to an input line of the image processing device 150, and a working contact c is connected to a signal input line of the camera signal processing unit 160.

The switching unit 140 is controlled so that the fixed contact a is connected to the working contact c when closing the stop. On the other hand, when not closing the stop, this is controlled so that the fixed contact a is connected to the working contact b.

The image processing device (two-dimensional convolution means) 150 configuring a part of the signal processing unit receives as input the digital signal of the captured image coming from the AFE 130 in the front stage, applies two-dimensional convolution processing, and transfers the result to the camera signal processing unit (DSP) 160 in the latter stage.

The image processing device 150 performs the filtering on the optical transfer function (OTF) in accordance with the exposure information of the control device 200. Note that, stop information is included as the exposure information.

The image processing device 150 has a function of generating a dispersion-free image signal from a dispersed image signal of an object from the imaging element 120. Further, the signal processing unit has a function of applying noise reduction filtering in an initial step.

The processing of the image processing device 150 will be explained in further detail later.

The camera signal processing unit (DSP) 160 performs color interpolation, white balancing, YCbCr conversion processing, compression, filing, and other predetermined image processing and performs the storage into the memory 170, the image display in the image monitoring device 180, and so on.

The control device 200 performs exposure control and, at the same time, waits for operation inputs of the operating unit 190 etc., determines the operation of the overall system in accordance with these inputs, controls the AFE 130, image processing device 150, DSP 160, variable stop, etc., and conducts mediation control of the overall system.

Figure 4:
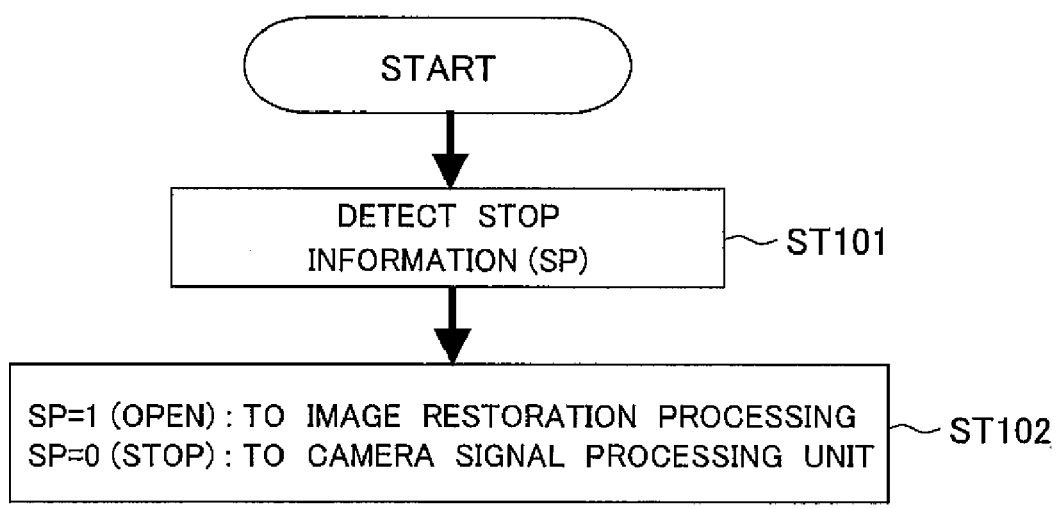
FIG. 4 is a diagram for explaining processing control of a captured image in accordance with the stop state.

The control device 200, as shown in FIG. 4, detects the stop information (ST101) and controls the switching unit 140 so as to input the dispersed image signal of the object captured by the imaging element 120 via the AFE 130 to the image processing device 150 and input a dispersion-free restored image signal to the camera signal processing unit 160 when not closing down the stop, while directly input the dispersed image signal of the object captured by the imaging element 120 via the AFE 130 to the camera signal processing unit 160 without passing it through the image processing device 150 when closing down the stop (ST102).

Below, the configurations and functions of the optical system and image processing device of the present embodiment will be further concretely explained.

Figure 5:
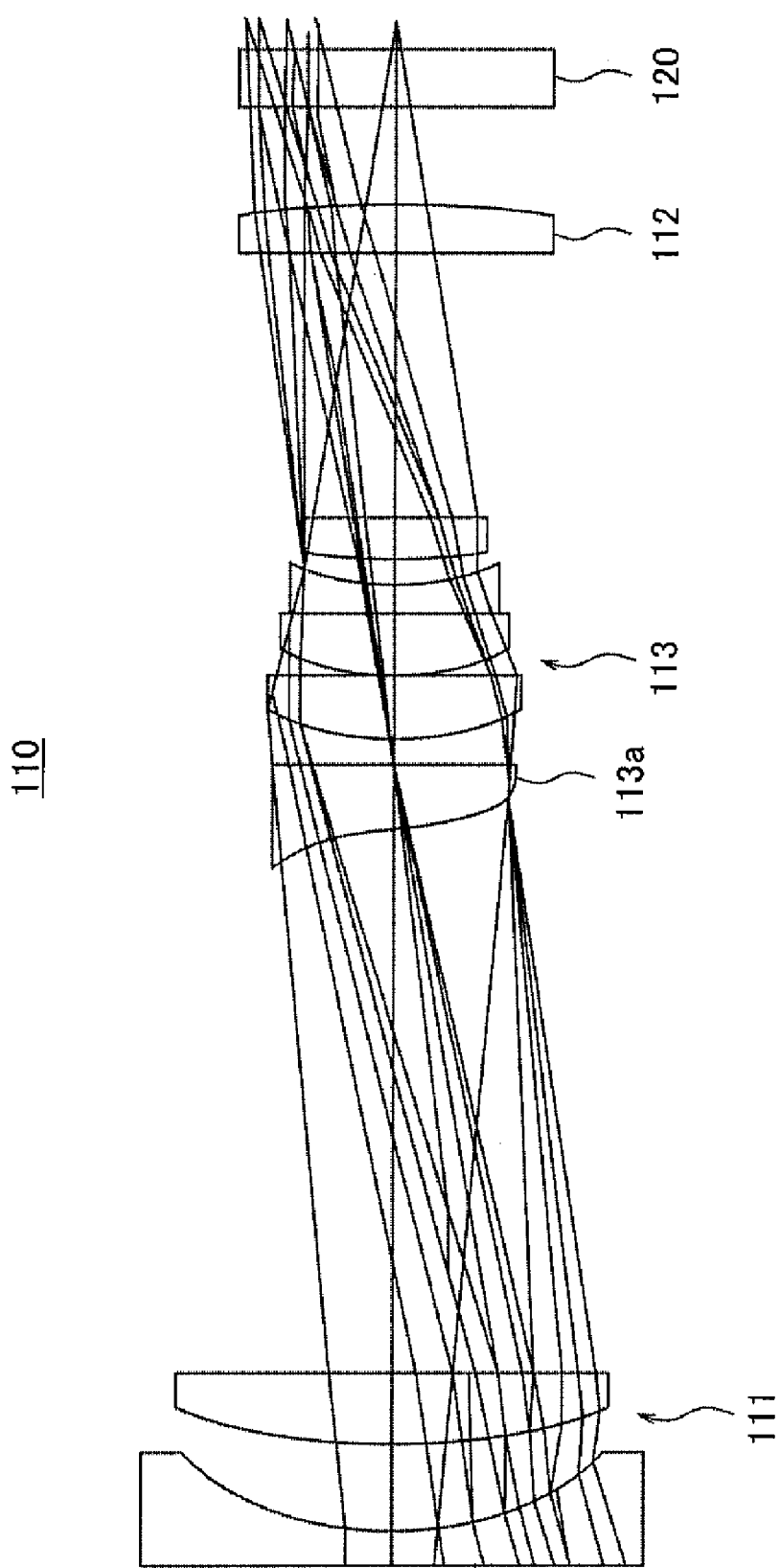
FIG. 5 is a diagram schematically showing an example of the configuration of a zoom optical system on a wide angle side of the imaging lens device according to the present embodiment.

FIG. 5 is a diagram schematically showing an example of the configuration of the zoom optical system 110 according to the present embodiment.

Figure 6:
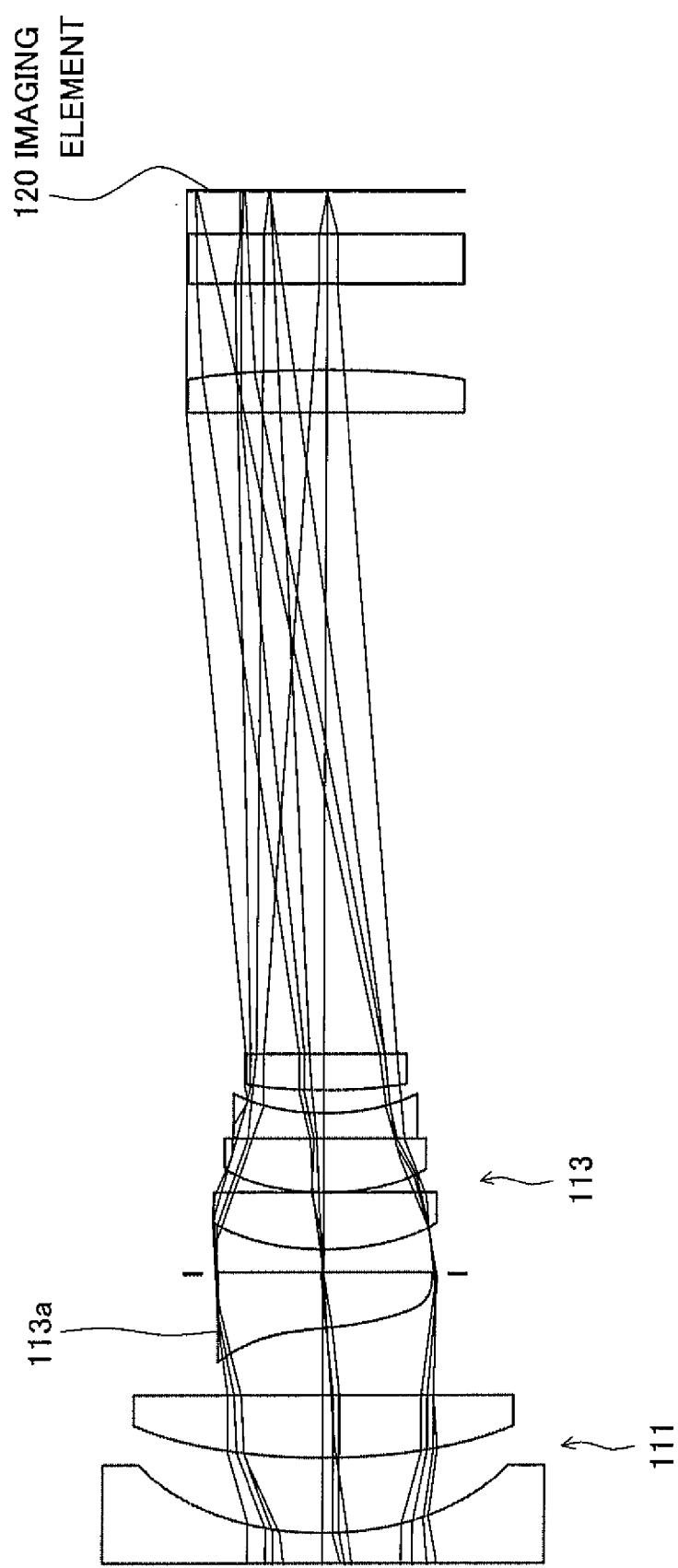
FIG. 6 is a diagram schematically showing an example of the configuration of the zoom optical system on a telescopic side of the imaging lens device according to the present embodiment.

Further, FIG. 6 is a diagram schematically showing an example of the configuration of the zoom optical system on the telescopic side of the imaging lens device according to the present embodiment.

Figure 7:
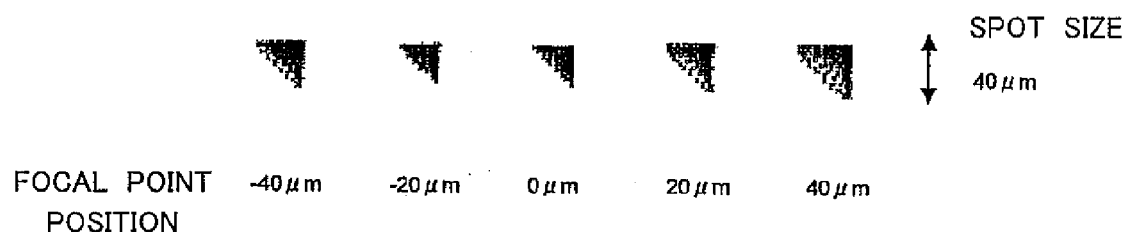
FIG. 7 is a diagram showing a spot shape at the center of image height on the wide angle side.
Figure 8:
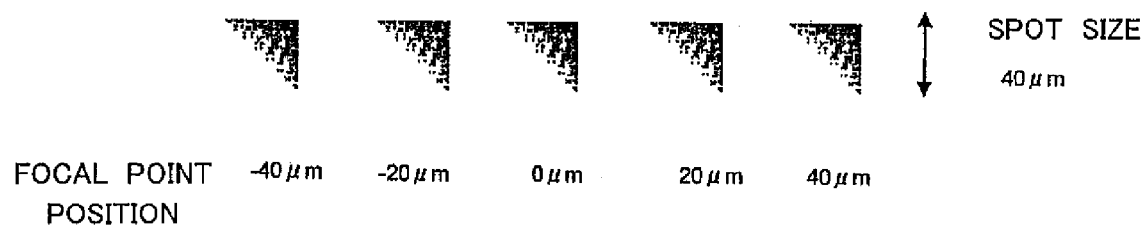
FIG. 8 is a diagram showing a spot shape at the center of image height on the telescopic side.

Furthermore, FIG. 7 is a diagram showing a spot shape at the center of image height on the wide angle side of the zoom optical system according to the present embodiment, and FIG. 8 is a diagram showing a spot shape at the center of image height on the telescopic side of the zoom optical system according to the present embodiment.

The zoom optical system 110 of FIG. 5 and FIG. 6 has an object side lens 111 arranged on the object side OBJS, an imaging lens 112 for forming an image in the imaging element 120, and an optical wavefront modulation element (wavefront coding optical element) group 113 arranged between the object side lens 111 and the imaging lens 112 and including a phase plate (cubic phase plate) deforming the wavefront of the image formed on the light receiving surface of the imaging element 120 by the imaging lens 112 and having for example a three-dimensional curved surface. Further, a not shown stop is arranged between the object side lens 111 and the imaging lens 112.

For example, in the present embodiment, a variable stop 200 is provided, and a stop degree (opening degree) of the variable sとp is controlled in the exposure control (device).

Note that, in the present embodiment, the explanation was given for the case where a phase plate was used, but the optical wavefront modulation elements of the present invention may include any elements so far as they deform the wavefront. They may include optical elements changing in thickness (for example, the above-explained third order phase plate), optical elements changing in refractive index (for example, a refractive index distribution type wavefront modulation lens), optical elements changing in thickness and refractive index by coating on the lens surface (for example, a wavefront coding hybrid lens), liquid crystal devices able to modulate the phase distribution of the light (for example, liquid crystal spatial phase modulation devices), and other optical wavefront modulation elements.

Further, in the present embodiment, an explanation was given of the case where a regularly dispersed image was formed by using a phase plate as the optical wavefront modulation element, but when selecting an element that can form a regularly dispersed image by the lens used as the usual optical system in the same way as the optical wavefront modulation element, the device can be realized by only the optical system without using an optical wavefront modulation element. At this time, this device cannot handle dispersion caused by the phase plate explained later, but can handle dispersion caused by the optical system.

The zoom optical system 110 of FIG. 5 and FIG. 6 is an example of inserting an optical phase plate 113a into a 3× zoom system used in a digital camera.

The phase plate 113a shown in the figure is an optical lens regularly dispersing the light rays converged by the optical system. By inserting this phase plate, an image not focused anywhere on the imaging element 120 is realized.

In other words, the phase plate 113a forms light rays having a deep depth (playing a central role in the image formation) and flare (blurred portion).

A means for restoring this regularly dispersed image to a focused image by digital processing will be referred to as a "wavefront aberration control optical system" or a depth expansion optical system (DEOS). This processing is carried out in the image processing device 150.

Here, the basic principle of the DEOS will be explained.

Figure 9:
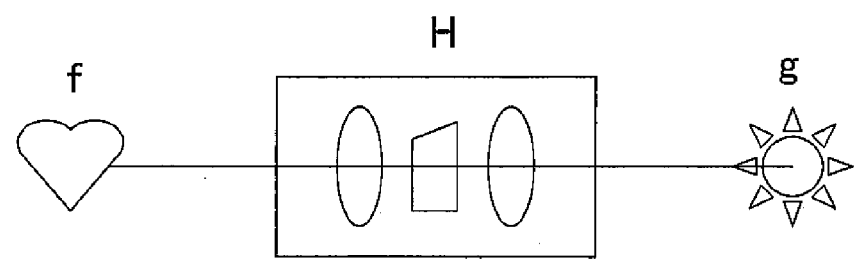
FIG. 9 is a diagram for explaining a principle of a DEOS.

As shown in FIG. 9, an image f of an object enters into the DEOS optical system H, whereby a g image is generated.

This is represented by the following equation:

$$g = H*f \qquad \text{(Equation 2)}$$

Where, * represents convolution.

In order to find the object from the generated image, the following processing is required;

$$f = H^{-1}*g \qquad \text{(Equation 3)}$$

Here, the kernel size and operational coefficient concerning the H will be explained.

The zoom positions are defined as Zpn, Zpn−1, . . . . Further, the H functions of these are defined as Hn, Hn−1, . . . .

The spots are different, therefore the H functions become as follows:

$$Hn = \begin{pmatrix} a & b & c \\ d & e & f \end{pmatrix} \qquad \text{[Equation 4]}$$

$$Hn-1 = \begin{pmatrix} a' & b' & c' \\ d' & e' & f' \\ g' & h' & i' \end{pmatrix}$$

The difference of the number of rows and/or the number of columns of this matrix is referred to as the "kernel size". The numbers are the operational coefficients.

Here, it is possible to store each H function in the memory or define the PSF as a function of the object distance, calculate it according to the object distance, and thereby calculate the H function so as to create the optimum filter for any object distance. Further, it is possible to use the H function as a function of the object distance and directly find the H function according to the object distance.

In the present embodiment, as shown in FIG. 3, the device is configured to receive an image from the optical system 110 at the imaging element 120, input it to the image processing device 150 at the time of opening the stop, acquire a conversion coefficient in accordance with the optical system, and use the acquired conversion coefficient to generate a dispersion-free image signal from a dispersed image signal from the imaging element 120.

Note that, in the present embodiment, "dispersion" means the phenomenon where, as explained above, inserting the phase plate 113a causes the formation of an image not focused anywhere on the imaging element 120 and the formation of light rays having a deep depth (playing a central role in the image formation) and flare (blurred portion) by the phase plate 113a and includes the same meaning as aberration because of the behavior of the image being dispersed and forming a blurred portion. Accordingly, in the present embodiment, there also exists a case where dispersion is explained as aberration.

In the present embodiment, DEOS is employed, so it is possible to obtain a high definition image quality. In addition, the optical system can be simplified, and the costs can be reduced.

Below, these characteristic features will be explained.

Figure 10A:
Figure 10B:
Figure 10C:

FIG. 10A to FIG. 10C show spot images on the light receiving surface of the imaging element 120.

FIG. 10A is a diagram showing a spot image in the case where the focal point is deviated by 0.2 mm (defocus=0.2 mm), FIG. 10B is a diagram showing a spot image in the case of focus (best focus), and FIG. 10C is a diagram showing a spot image in the case where the focal point is deviated by −0.2 mm (defocus=−0.2 mm).

As seen also from FIG. 10A to FIG. 10C, in the imaging device 100 according to the present embodiment, light rays having a deep depth (playing a central role in the image formation) and flare (blurred portion) are formed by the wavefront forming optical element group 113 including the phase plate 113a.

In this way, the first order image FIM formed in the imaging device 100 of the present embodiment is given light ray conditions resulting in deep depth.

Figure 11A:
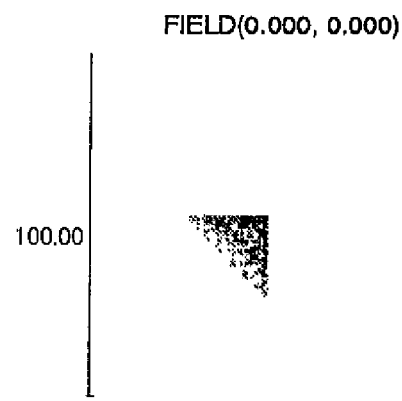
Figure 11B:
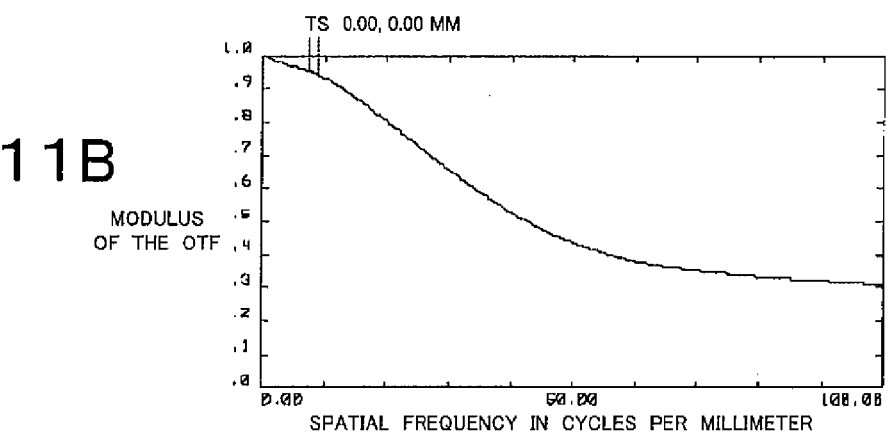

FIG. 11A and FIG. 11B are diagrams for explaining a modulation transfer function (MTF) of the first order image formed by the imaging lens device according to the present embodiment, in which FIG. 11A is a diagram showing a spot image on the light receiving surface of the imaging element of the imaging lens device, and FIG. 11B shows the MTF characteristic with respect to the spatial frequency.

In the present embodiment, the high definition final image is left to the correction processing of the latter stage image processing device 150 configured by, for example, a digital signal processor. Therefore, as shown in FIG. 11A and FIG. 11B, the MTF of the first order image essentially becomes a low value.

The image processing device 150, as explained above, receives the first order image FIM from the imaging element 120, applies predetermined correction processing etc. for boosting the MTF at the spatial frequency of the first order image, and forms a high definition final image FNLIM.

Figure 12:
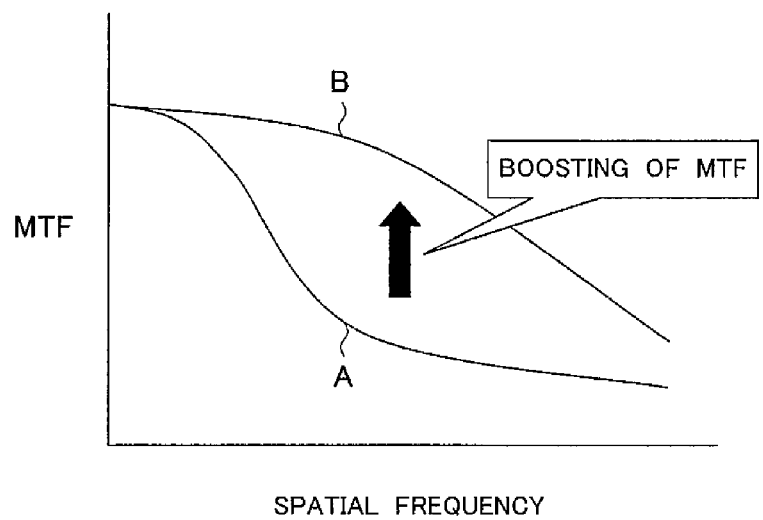
FIG. 12 is a diagram for explaining an MTF correction processing in the image processing apparatus according to the present embodiment.

The MTF correction processing of the image processing device 150 performs correction so that, for example as indicated by a curve A of FIG. 12, the MTF of the first order image which essentially becomes a low value approaches (reaches) the characteristic indicated by a curve B in FIG. 12 by post-processing such as edge enhancement and chroma enhancement using the spatial frequency as a parameter.

The characteristic indicated by the curve B in FIG. 10 is the characteristic obtained in the case where the wavefront forming optical element is not used and the wavefront is not deformed as in for example the present embodiment.

Note that all corrections in the present embodiment are according to the parameter of the spatial frequency.

In the present embodiment, as shown in FIG. 12, in order to achieve the MTF characteristic curve B desired to be finally realized with respect to the MTF characteristic curve A for the optically obtained spatial frequency, the strength of the edge enhancement etc. is adjusted for each spatial frequency to correct the original image (first order image).

Figure 13:
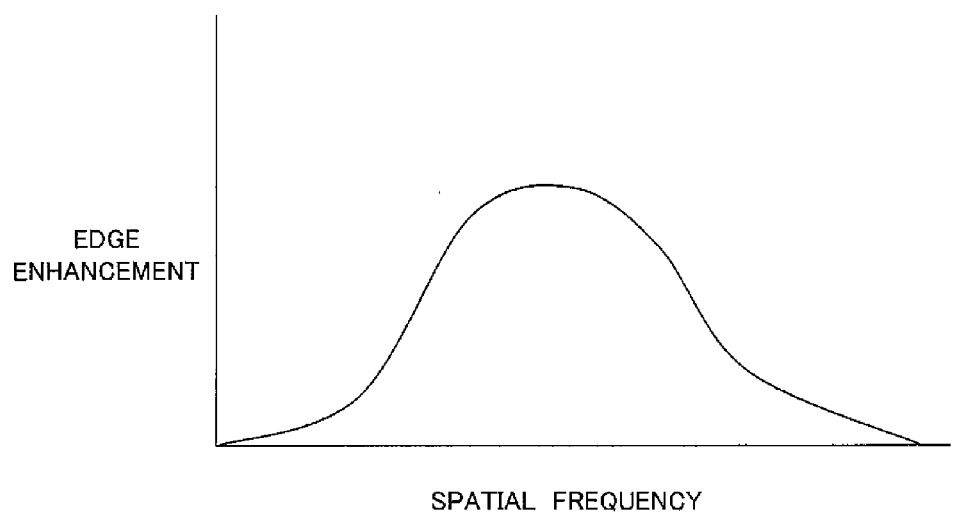
FIG. 13 is a diagram for concretely explaining the MTF correction processing in the image processing apparatus according to the present embodiment.

For example, in the case of the MTF characteristic of FIG. 12, the curve of the edge enhancement with respect to the spatial frequency becomes as shown in FIG. 13.

Namely, by performing the correction by weakening the edge enhancement on the low frequency side and high frequency side within a predetermined bandwidth of the spatial frequency and strengthening the edge enhancement in an intermediate frequency zone, the desired MTF characteristic curve B is virtually realized.

In this way, the imaging device 100 according to the present embodiment is an image forming system basically configured by the optical system 110 and imaging element 120 for forming the first order image and the image processing device 150 for forming the first order image to a high definition final image. The optical system is newly provided with a wavefront forming optical element or is provided with a glass, plastic, or other optical element with a surface shaped for wavefront forming use so as to deform (modulate) the wavefront of the image formed. Such a wavefront is focused onto the imaging surface (light receiving surface) of the imaging element 120 formed by a CCD or CMOS sensor. The focused first order image is passed through the image processing device 150 to obtain the high definition image.

In the present embodiment, the first order image from the imaging element 120 is given light ray conditions with very deep depth. For this reason, the MTF of the first order image essentially becomes a low value, and the MTF thereof is corrected by the image processing device 150.

Here, the process of image formation in the imaging device 100 of the present embodiment will be considered in terms of wave optics.

A spherical wave scattered from one point of an object point becomes a converged wave after passing through the imaging optical system. At that time, when the imaging optical system is not an ideal optical system, aberration occurs. The wavefront becomes not spherical, but a complex shape. Geometric optics and wave optics are bridged by wavefront optics. This is convenient in the case where a wavefront phenomenon is handled.

When handling a wave optical MTF on an imaging plane, the wavefront information at an exit pupil position of the imaging optical system becomes important.

The MTF is calculated by a Fourier transform of the wave optical intensity distribution at the imaging point. The wave optical intensity distribution is obtained by squaring the wave optical amplitude distribution. That wave optical amplitude distribution is found from a Fourier transform of a pupil function at the exit pupil.

Further, the pupil function is just the wavefront information (wavefront aberration) at the exit pupil position, therefore if the wavefront aberration can be strictly calculated as a numerical value through the optical system 110, the MTF can be calculated.

Accordingly, if modifying the wavefront information at the exit pupil position by a predetermined technique, the MTF value on the imaging plane can be freely changed.

In the present embodiment as well, the shape of the wavefront is mainly changed by a wavefront forming optical element. It is truly the phase (phase and length of light path along the light rays) that is adjusted to form the desired wavefront.

Then, when forming the target wavefront, the light rays emitted from the exit pupil are formed by a dense light ray portion and a sparse light ray portion as seen from the geometric optical spot images shown in FIG. 10A to FIG. 10C.

The MTF of this state of light rays exhibits a low value at a position where the spatial frequency is low and somehow maintains the resolution up to the position where the spatial frequency is high.

Namely, if this low MTF value (or, geometric optically, the state of the spot image), the phenomenon of aliasing will not be caused.

That is, a low pass filter is not necessary.

Further, the flare-like image causing a drop in the MTF value may be eliminated by the image processing device 150 configured by the later stage DSP etc. Due to this, the MTF value is remarkably improved.

Next, responses of the MTF of the present embodiment and a conventional optical system will be considered.

Figure 14:
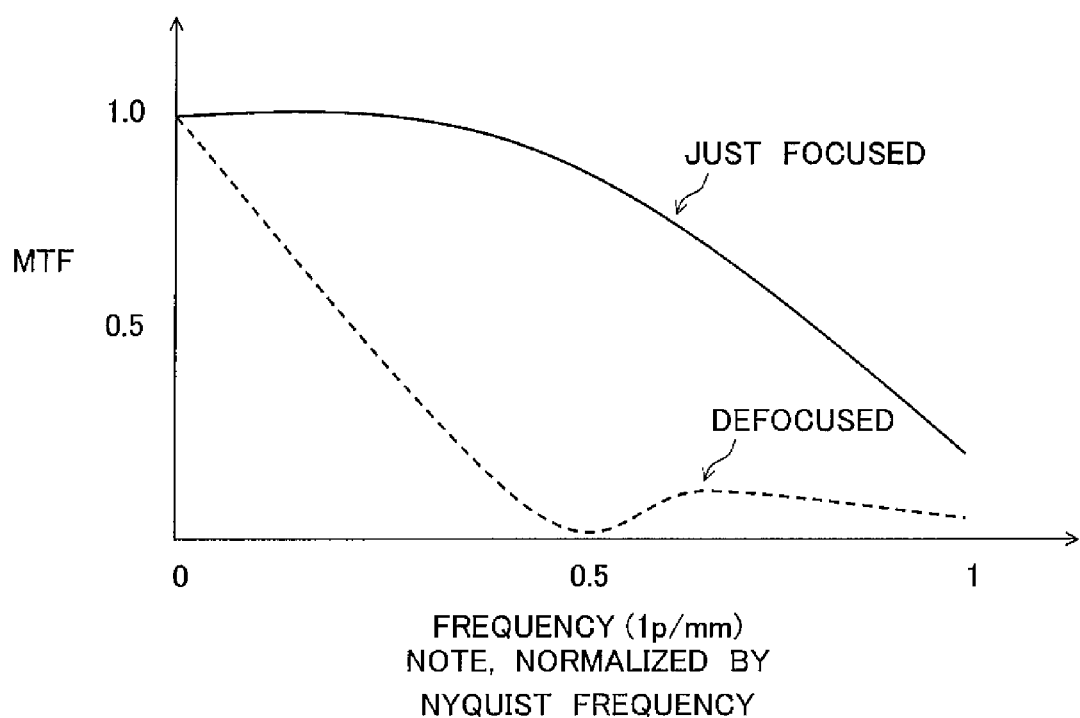
FIG. 14 is a diagram showing responses of the MTF at a time when the object is located at the focus position and a time when the object is off from the focus position in the case of the general optical system.

FIG. 14 is a diagram showing the responses of the MTF at a time when the object is located at the focus position and a time when it is out of the focus position in the case of the general optical system.

Figure 15:
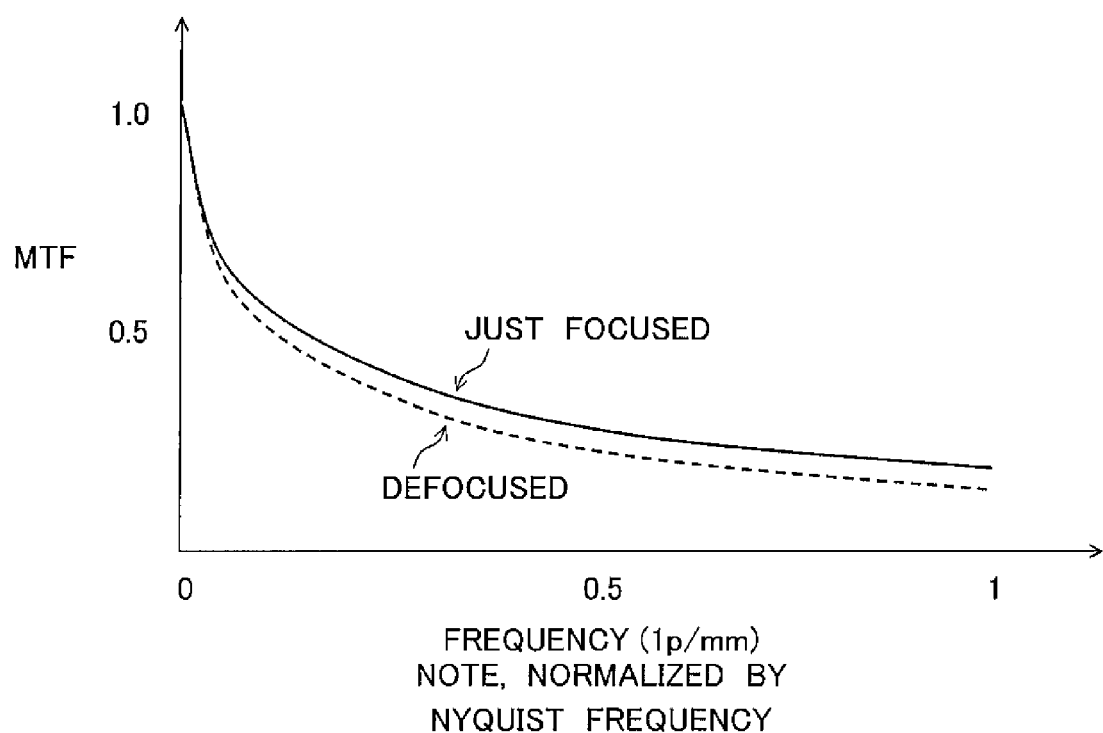
FIG. 15 is a diagram showing responses of the MTF at the time when the object is located at the focus position and the time when the object is off from the focus position in the case of the optical system of the present embodiment having an optical wavefront modulation element.

FIG. 15 is a diagram showing responses of the MTF at the time when the object is located at the focus position and the time when it is out of the focus position in the case of the optical system of the present embodiment having an optical wavefront modulation element.

Figure 16:
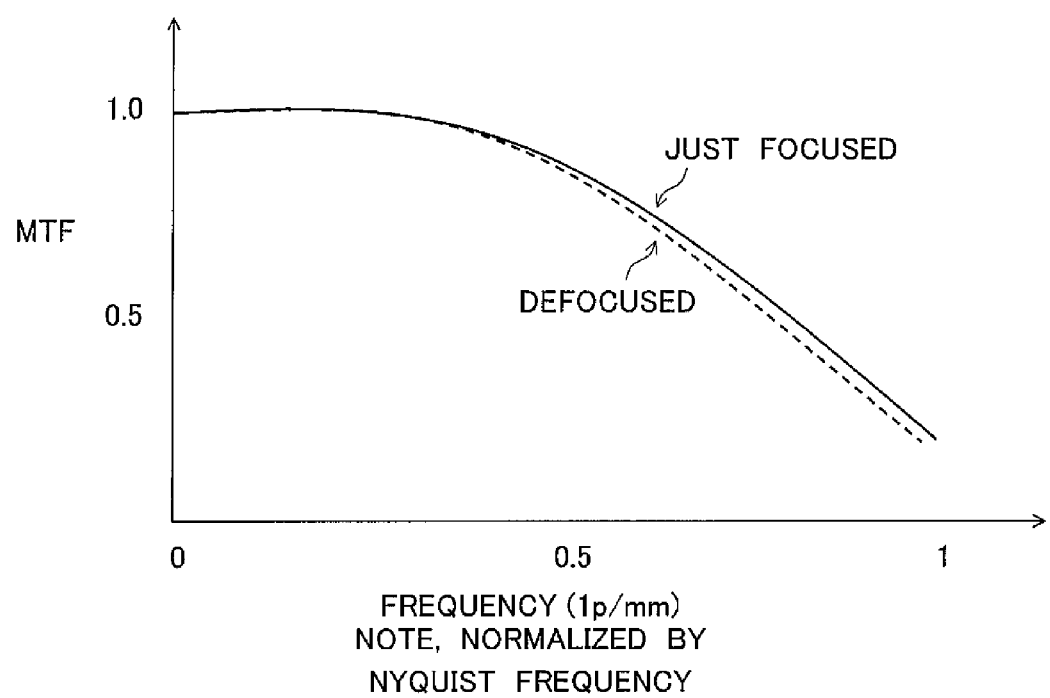
FIG. 16 is a diagram showing the response of the MTF after data restoration of the imaging device according to the present embodiment.

Further, FIG. 16 is a diagram showing the response of the MTF after the data restoration of the imaging device according to the present embodiment.

As seen from the figures as well, in the case of the optical system having an optical wavefront modulation element, even in the case where the object is out of the focus position, the change of the response of the MTF becomes smaller than that in the optical system not inserting an optical wavefront modulation element.

The image formed by this optical system is subjected to the processing by the convolution filter, whereby the response of the MTF is improved.

The absolute value (MTF) of the OTF of the optical system having the phase plate shown in FIG. 15 is preferably 0.1 or more at the Nyquist frequency.

This is because, in order to achieve the OTF after the restoration shown in FIG. 16, the gain is raised by the restoration filter, but this means that the noise of the sensor is simultaneously raised. For this reason, preferably the restoration is carried out while preventing the rise of the gain as much as possible at a high frequency near the Nyquist frequency.

In the case of the usual optical system, resolution is achieved if the MTF at the Nyquist frequency is 0.1 or more.

Accordingly, when the MTF before the restoration is 0.1 or more, the gain at the Nyquist frequency may not be raised by the restoration filter. When the MTF before the restoration is less than 0.1, the restored image becomes an image that is largely influenced by the noise, so this is not preferred.

Figure 17:
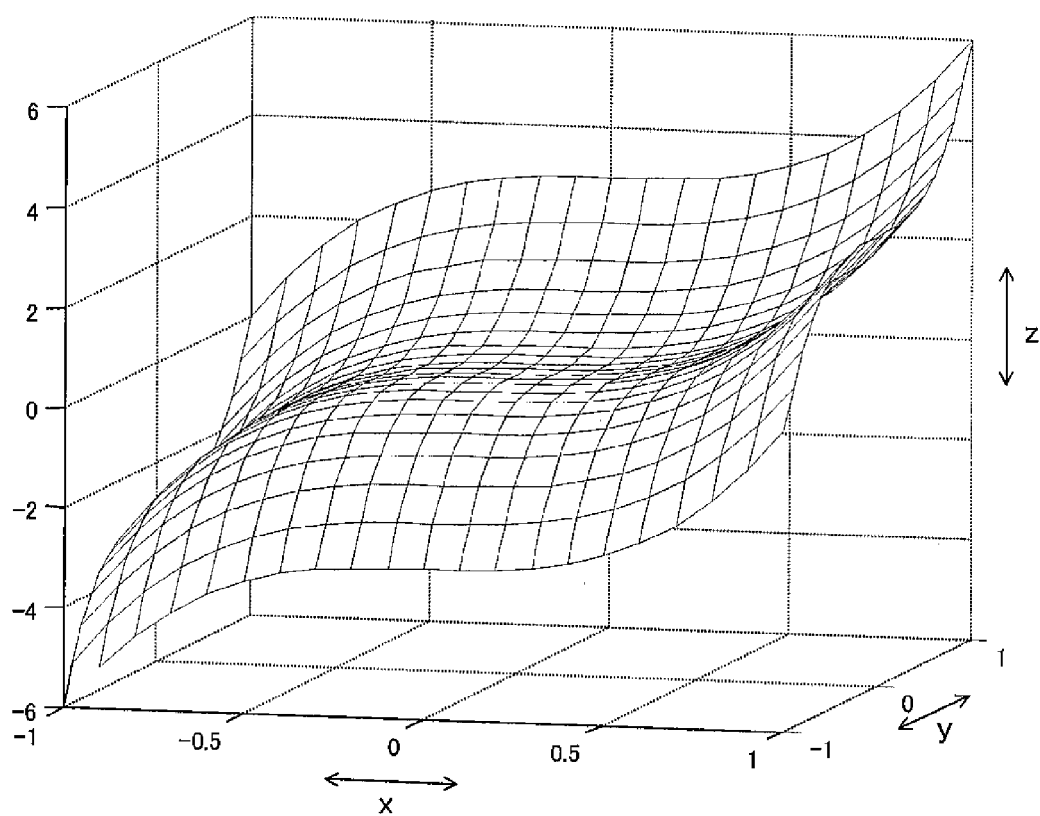
FIG. 17 is a diagram showing a shape of a wavefront aberration represented by an equation where an optical axis of the optical system including the optical wavefront modulation element of the present embodiment is a z-axis, and two axes perpendicular to each other are x and y.
Figure 18:
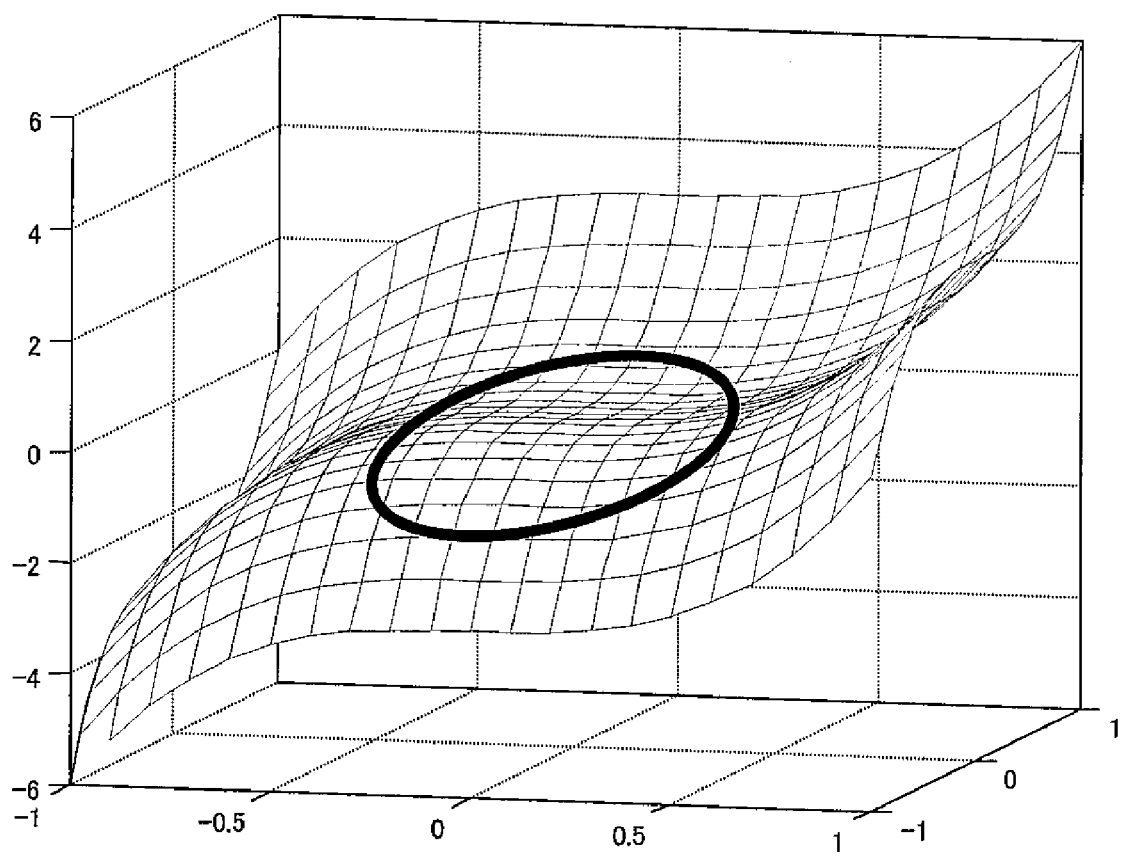
FIG. 18 is a diagram representing the shape of the wavefront aberration, and a range of $0.5\lambda$ or less by a bold line.

Further, FIG. 17 shows the shape of the wavefront aberration represented by the following equation where an optical axis of the optical system including the optical wavefront modulation element is a z-axis, and two axes perpendicular to each other are x and y.

$$Z=\alpha'(x^3+y^3) \quad \text{[Equation 5]}$$

where $|x| \leq 1$, $|y| \leq 1$, and Z represents the wavefront aberration.

Within the range where the wavefront aberration is $0.5\lambda$ or less, the change of the phase is small, and this optical system has an OTF no different from that of the usual optical system. Accordingly, when closing down the stop to when the wavefront aberration becomes about $0.5\lambda$, the image restoration processing is not carried out, but the image signal is input to the camera signal processing portion 160 the same as the usual optical system.

Note that, the shape shown in FIG. 17 is one example. Any shape can be applied so far as the optical wavefront modulation element has a phase represented by the following equation where the optical axis of the optical system is the z-axis, and two axes perpendicular to each other are x and y.

$$z = \exp\left\{i \times \left(\sum_{j=1} C_j x^m y^n\right)\right\} \quad \text{[Equation 6]}$$

where, n and m are integers, $j=[(m+n)^2+m+3n)]/2$, $|x| \leq 1$, and $|y| \leq 1$.

Next, the configuration and processing of the image processing device 150 will be explained.

The image processing device 150r as shown in FIG. 3, has a raw buffer memory 151, a convolution operation unit 152, a storing means constituted by the kernel data storage ROM 153, and convolution control unit 154.

The convolution control unit 154 controls the ON/OFF state of the convolution processing, screen size, replacement of kernel data, etc. and is controlled by the control device 200.

Further, the device stores the convolution use kernel data calculated by the PSF of each optical system prepared in advance in the kernel data storage ROM 153, as shown in FIG. 19, FIG. 20, or FIG. 21, acquires the exposure information determined at the time of the setting the exposure by the control device 200, and selects and controls the kernel data through the convolution control unit 154.

Note that, the exposure information includes the stop information.

In the example of FIG. 19, the kernel data A becomes data corresponding to an optical magnification (×1.5), the kernel data B becomes data corresponding to an optical magnification (×5), and the kernel data C becomes data corresponding to an optical magnification (×10).

Further, in the example of FIG. 20, the kernel data A becomes data corresponding to an F number (2.8) as the stop, and the kernel data B becomes data corresponding to an F number (4). Note that the F number (2.8) and the F number (4) are outside the range of $0.5\lambda$.

Further, in the example of FIG. 21, the kernel data A becomes data corresponding to object distance information being 100 mm, the kernel data B becomes data corresponding to object distance information being 500 mm, and the kernel data C becomes data corresponding to object distance information being 4 m.

As in the example of FIG. 20, the filtering is carried out in accordance with the stop information for the following reason.

In a case of capturing an image while closing the stop, the phase plate 113a forming the optical wavefront modulation element is covered by the stop and the phase changes, so it becomes difficult to restore a proper image.

Therefore, in the present embodiment, as in the present example, proper image restoration is realized by performing the filtering in accordance with the stop information in the exposure information.

Figure 22:
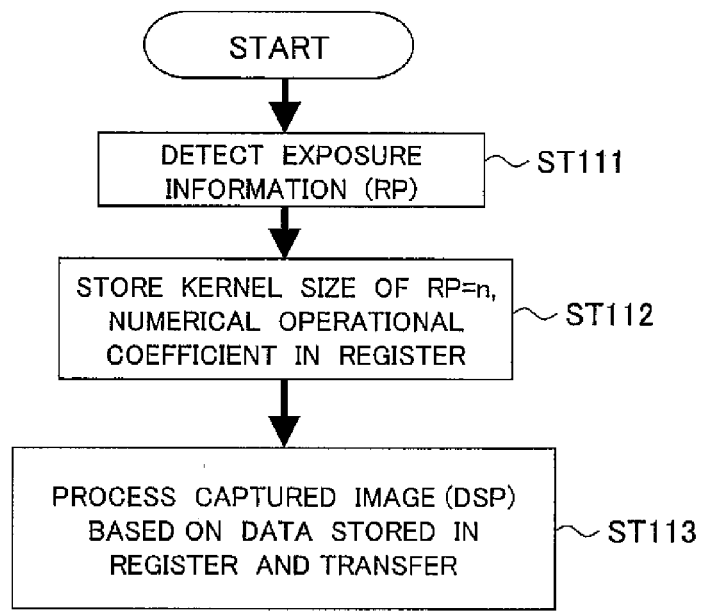
FIG. 22 is a flow chart schematically showing processing for setting an optical system of an exposure control device.

FIG. 22 is a flow chart of switching according to the exposure information (including stop information) of the control device 200.

First, the exposure information (RP) is detected and supplied to the convolution control unit 154 (ST111).

In the convolution control unit 154, from the exposure information RP, the kernel size and numerical operational coefficient are set in a register (ST112).

Then, the image data captured by the imaging element 120 and input to the two-dimensional convolution operation unit 152 via the AFE 130 is subjected to a convolution operation based on the data stored in the register. The processed and converted data is transferred to the camera signal processing unit (DSP) 160 (ST113).

Below, a further concrete example of the signal processing unit and kernel data storage ROM of the image processing device 150 will be explained.

Figure 23:
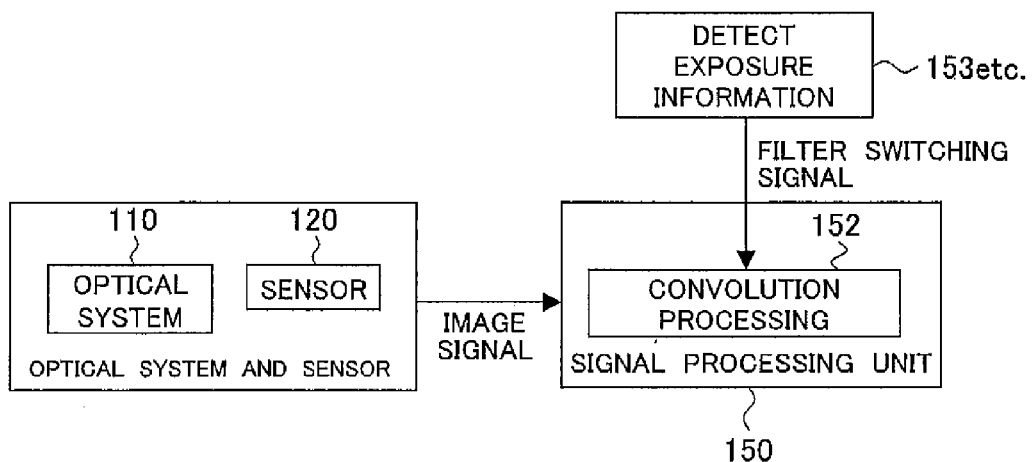
FIG. 23 is a diagram showing a first example of the configuration of a signal processing unit and the kernel data storage ROM.

FIG. 23 is a diagram showing a first example of the configuration for the signal processing unit and kernel data storage ROM. Note that, for simplification, the AFE etc. are omitted.

Figure 24:
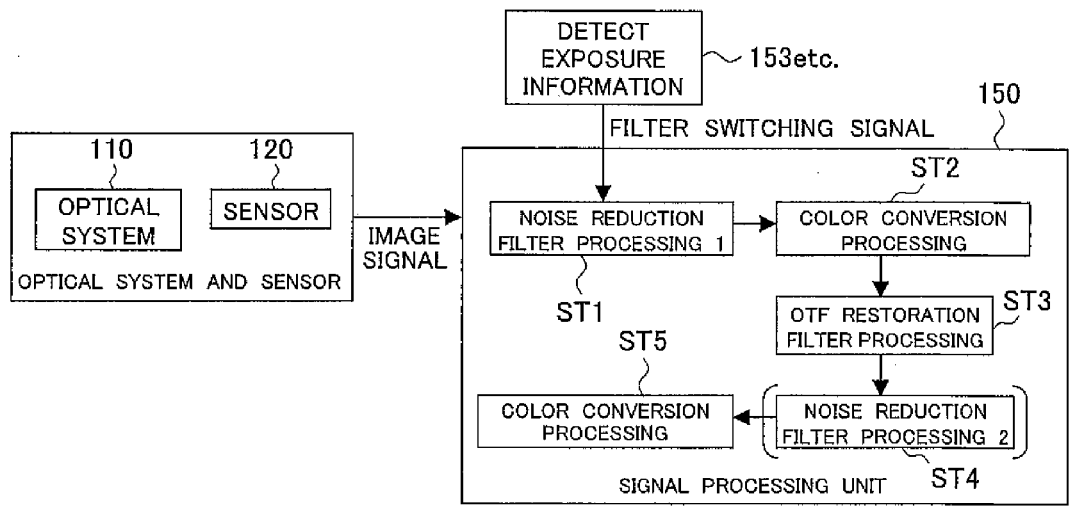
FIG. 24 is a diagram showing a second example of the configuration of a signal processing unit and the kernel data storage ROM.

The example of FIG. 24 is a block diagram of the case where a filter kernel is prepared in advance in accordance with the exposure information.

The signal processing unit acquires exposure information determined at the time of setting the exposure and selects and controls the kernel data through the convolution control unit 154. The two-dimensional convolution operation unit 152 applies the convolution processing by using the kernel data.

FIG. 24 is a diagram showing a second example of the configuration for the signal processing unit and kernel data storage ROM. Note that, for simplification, the AFE etc. are omitted.

The example of FIG. 23 is a block diagram of the case where a step of noise reduction filtering is provided at the start of the signal processing unit, and noise reduction filtering ST1 in accordance with the exposure information is prepared in advance as the filter kernel data.

The signal processing unit acquires the exposure information determined at the time of setting the exposure and selects and controls the kernel data through the convolution control unit 154.

The two-dimensional convolution operation unit 152, after application of the noise reduction filter ST1, converts the color space by the color conversion processing ST2, then applies the convolution processing ST3 using the kernel data after that.

The signal processing unit performs the noise processing ST4 again and returns the converted color space to the original color space by the color conversion processing ST5. As the color conversion processing, for example YCbCr conversion can be mentioned, but the other conversion may be employed as well.

Note that it is also possible to omit the second noise processing ST4.

Figure 25:
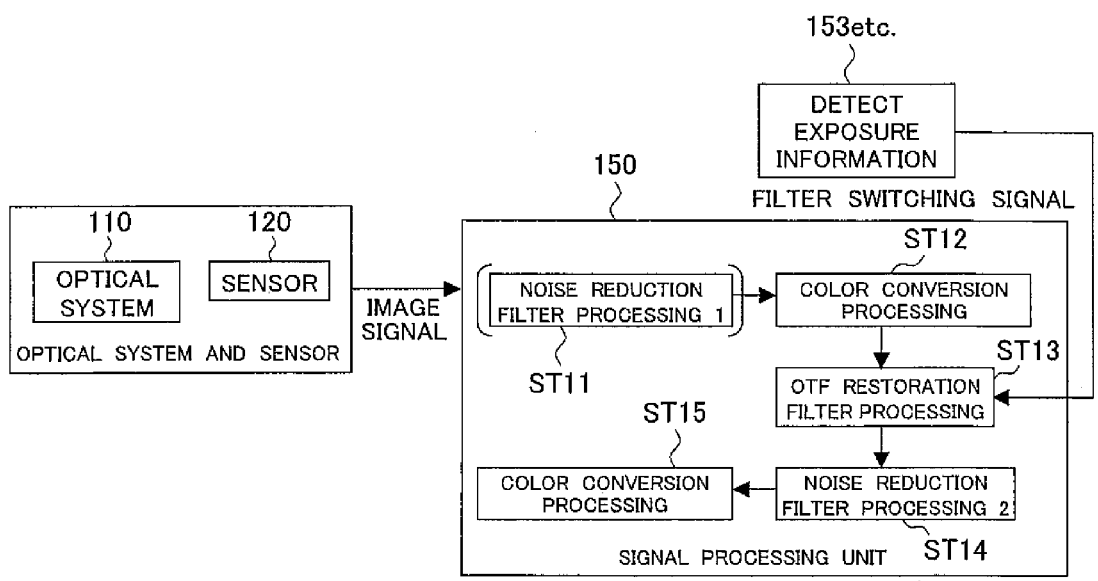
FIG. 25 is a diagram showing a third example of the configuration of a signal processing unit and the kernel data storage ROM.

FIG. 25 is a diagram showing a third example of the configuration for the signal processing unit and kernel data storage ROM. Note that, for simplification, the AFE etc. are omitted.

The example of FIG. 25 is a block diagram of the case where an OTF restoration filter is prepared in advance in accordance with the exposure information.

The signal processing unit acquires the exposure information determined at the time of setting the exposure and selects and controls the kernel data through the convolution control unit 154.

The two-dimensional convolution operation unit 152, after the noise reduction processing ST11 and color conversion processing ST12, applies the convolution processing ST13 by using the OTF restoration filter.

The signal processing unit performs the noise processing ST14 again and returns the converted color space to the original color space by the color conversion processing ST15. As the color conversion processing, for example the YCbCr conversion can be mentioned, but other conversion may be employed as well.

Note that it is also possible to perform just one of the noise reduction processings ST11 and ST14.

Figure 26:
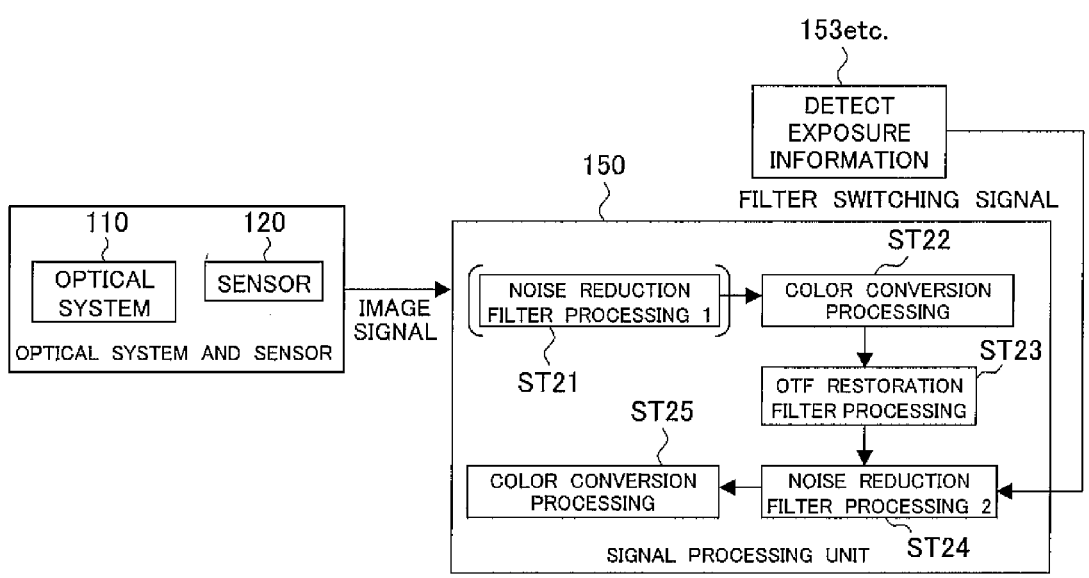
FIG. 26 is a diagram showing a fourth example of the configuration of a signal processing unit and the kernel data storage ROM.

FIG. 26 is a diagram showing a fourth example of the configuration for the signal processing unit and kernel data storage ROM. Note that, for simplification, the AFE etc. are omitted.

The example of FIG. 26 is a block diagram of the case where a step of noise reduction filtering is provided, and a noise reduction filter is prepared in advance as the filter kernel data in accordance with the exposure information.

The signal processing unit acquires the exposure information determined at the time of setting the exposure and selects and controls the kernel data through the convolution control unit 154.

The two-dimensional convolution operation unit 152, after application of the noise reduction filter ST21, converts the color space by the color conversion processing ST22, then applies the convolution processing ST23 by using the kernel data.

The signal processing unit carries out noise processing ST24 in accordance with the exposure information again and returns the converted color space to the original color space by the color conversion processing ST25. As the color conversion processing, for example, YCbCr conversion can be mentioned, but other conversion may be employed as well.

Note that it is also possible to omit the noise reduction processing ST21.

Above, an example of the two-dimensional convolution operation unit 152 performing the filtering in accordance with only the exposure information was explained, but by combining for example the object distance information, zoom information, or image capturing mode information and the exposure information, it becomes possible to extraction a suitable operational coefficient or operation.

Figure 27:
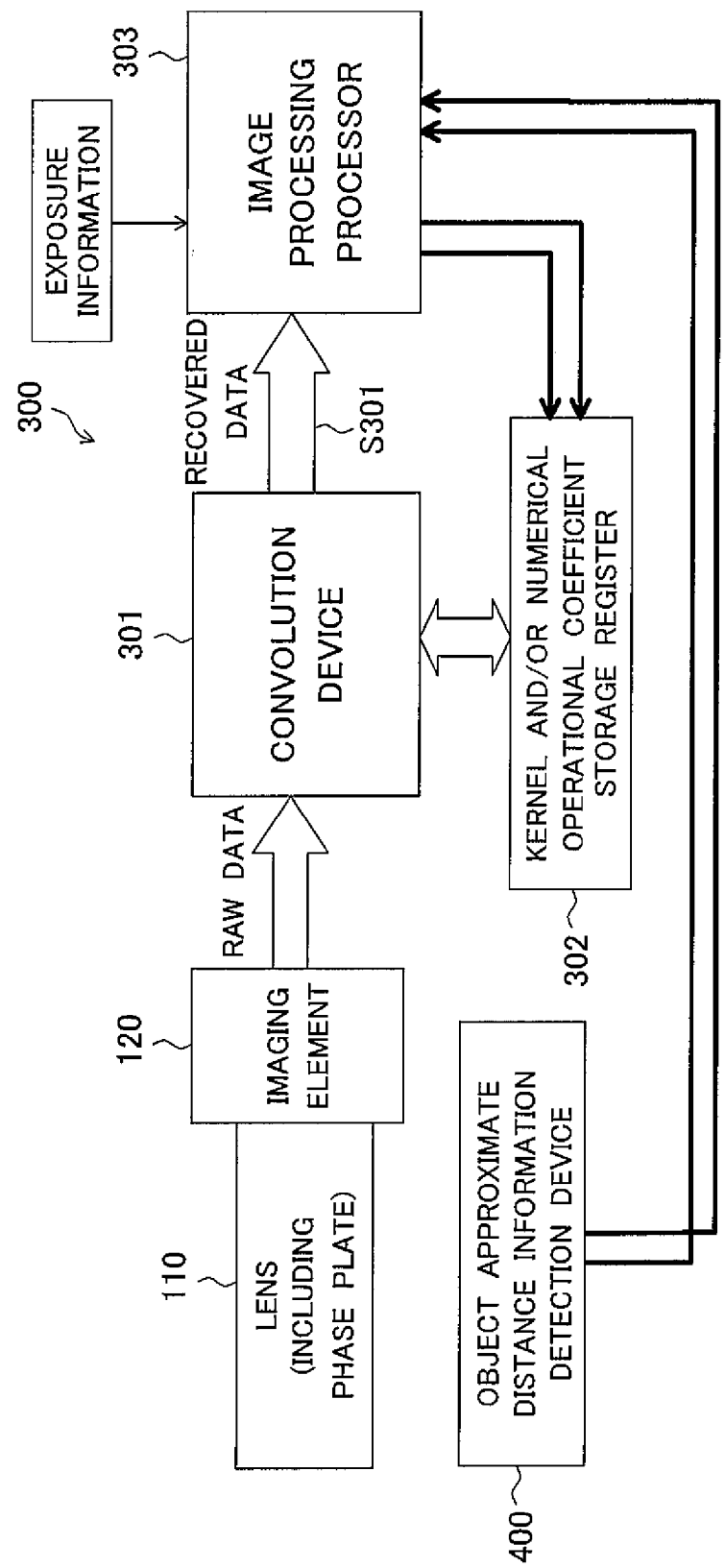
FIG. 27 is a diagram showing an example of the configuration of an image processing apparatus combining object distance information and exposure information.

FIG. 27 is a diagram showing an example of the configuration of an image processing device combining object distance information and exposure information.

FIG. 27 shows an example of the configuration of an image processing device 300 for generating a dispersion-free image signal from a dispersed image signal of an object from the imaging element 120.

The image processing device 300, as shown in FIG. 27, has a convolution device 301, a kernel and/or numerical operational coefficient storage register 302, and an image processing processor 303.

In this image processing device 300, the image processing processor 303 obtains information concerning the approximate distance of the object distance of an object read out from an object approximate distance information detection device 400 and exposure information. It stores the kernel size and its operational coefficients used in suitable operation for the object distance position in the kernel and/or numerical operational coefficient storage register 302 and performs the suitable operation by the convolution device 301 by using those values to restore the image.

As explained above, in the case of an imaging device having a phase plate (wavefront coding optical element) as an optical wavefront modulation element, if within a predetermined focal distance range, a suitable aberration-free image signal can be generated by image processing concerning that range, but if out of the predetermined focal length range, there is a limit to the correction of the image processing, therefore only an object out of the above range ends up becoming an image signal with aberration.

Further, on the other hand, by applying image processing not causing aberration within a predetermined narrow range, it also becomes possible to give blurriness to an image out of the predetermined narrow range.

The present example is configured so as to detect the distance up to the main object by the object approximate distance information detection device 400 including a distance detection sensor and perform processing for image correction different in accordance with the detected distance.

The above image processing is carried out by convolution operation. In order to accomplish this, for example, it is possible to commonly store one type of operational coefficient of the convolution operation, store in advance a correction coefficient in accordance with the focal length, correct the operational coefficient by using this correction coefficient, and perform suitable convolution operation by the corrected operational coefficient.

Other than this configuration, it is possible to employ the following configurations.

It is possible to employ a configuration storing in advance the kernel size and the operational coefficient itself of the convolution in accordance with the focal length and perform a convolution operation by these stored kernel size and operational coefficient, a configuration storing in advance the operational coefficient in accordance with a focal length as a function, finding the operational coefficient by this function according to the focal length, and performing the convolution operation by the calculated operational coefficient, and so on.

When linked with the configuration of FIG. 27, the following configuration can be employed.

At least two conversion coefficients corresponding to the aberration due to at least the phase plate 113a are stored in advance in the conversion coefficient storing means constituted by the register 302 in accordance with the object distance. The image processing processor 303 functions as the coefficient selecting means for selecting a conversion coefficient in accordance with the distance up to the object from the register 302 based on the information generated by the object distance information generating means constituted by the object approximate distance information detection device 400.

Furthermore, the converting means constituted by the convolution device 301 converts the image signal according to the conversion coefficient selected at the coefficient selecting means constituted by the image processing processor 303.

Alternatively, as explained above, the conversion coefficient operation means constituted by the image processing processor 303 processes the conversion coefficient based on the information generated by the object distance information generating means constituted by the object approximate distance information detection device 400 and stores the result in the register 302.

Furthermore, the converting means constituted by the convolution device 301 converts the image signal according to the conversion coefficient obtained by the conversion coefficient operation means constituted by the image processing processor 303 and stored in the register 302.

Alternatively, the correction value storing means constituted by the register 302 stores at least one correction value in accordance with the zoom position or zoom amount of the zoom optical system 110 in advance. This correction value includes the kernel size of the object aberration image.

The register 302, functioning also as the second conversion coefficient storing means, stores in advance the conversion coefficient corresponding to the aberration due to the phase plate 113a.

Then, based on the distance information generated by the object distance information generating means constituted by the object approximate distance information detection device 400, the correction value selecting means constituted by the image processing processor 303 selects the correction value in accordance with the distance up to the object from the correction value storing means constituted by the register 302.

The converting means constituted by the convolution device 301 converts the image signal based on the conversion coefficient obtained from the second conversion coefficient storing means constituted by the register 302 and the correction value selected by the correction value selecting means constituted by the image processing processor 303.

Figure 28:
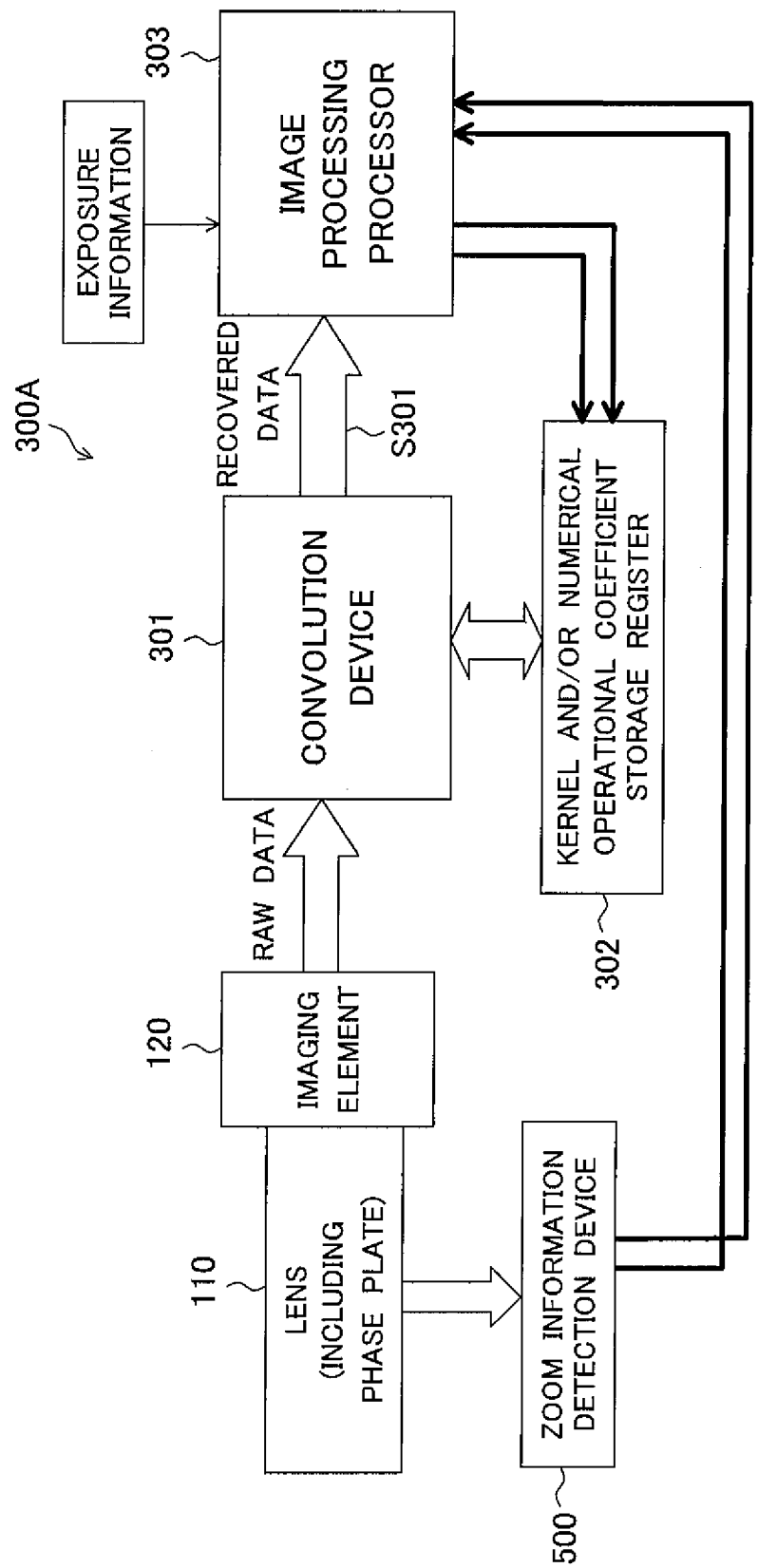
FIG. 28 is a diagram showing an example of the configuration of an image processing apparatus combining zoom information and exposure information.

FIG. 28 is a diagram showing an example of the configuration of an image processing device combining zoom information and exposure information.

FIG. 28 shows an example of the configuration of an image processing device 300A generating a dispersion-free image signal from a dispersed image signal of an object from the imaging element 120.

The image processing device 300A, in the same way as FIG. 27, as shown in FIG. 28, has a convolution device 301, kernel and/or numerical operational coefficient storage register 302, and image processing processor 303.

In this image processing device 300A, the image processing processor 303 obtains information concerning the zoom position or zoom amount read out from the zoom information detection device 500 and the exposure information. It stores the kernel size and its operational coefficient used for suitable operation for the exposure information and zoom position in the kernel and/or numerical operational coefficient storage register 302 and performs suitable operation to restore the image at the convolution device 301 performing operation using those values.

As explained above, when applying a phase plate as an optical wavefront modulation optical element to an imaging device provided in a zoom optical system, the generated spot image differs according to the zoom position of the zoom optical system. For this reason, when performing the convolution operation of a focal point deviated image (spot image) obtained by the phase plate in a later DSP etc., in order to obtain the suitable focused image, convolution operation differing in accordance with the zoom position becomes necessary.

Therefore, the present embodiment is configured provided with the zoom information detection device 500, performing a suitable convolution operation in accordance with the zoom position, and obtaining a suitable focused image without regard as to the zoom position.

For suitable convolution operation in the image processing device 300A, it is possible to configure the system to commonly store one type of operational coefficient of convolution in the register 302.

Other than this configuration, it is also possible to employ the following configurations.

It is possible to employ a configuration storing in advance a correction coefficient in the register 302 in accordance with each zoom position, correcting the operational coefficient by using this correction coefficient, and performing a suitable convolution operation by the corrected operational coefficient, a configuration storing in advance the kernel size and the operational coefficient itself of the convolution in the register 302 in accordance with each zoom position and performing a convolution operation by these stored kernel size and operational coefficient, a configuration storing in advance the operational coefficient in accordance with the zoom position as a function in the register 302, finding the operational coefficient by this function according to the zoom position, and performing a convolution operation by the calculated operational coefficient, and so on.

When linking this with the configuration of FIG. 28, the following configuration can be employed.

The conversion coefficient storing means constituted by the register 302 stores in advance at least two conversion coefficients corresponding to aberration caused by the phase plate 113a in accordance with the zoom position or zoom amount of the zoom optical system 110. The image processing processor 303 functions as a coefficient selecting means for selecting the conversion coefficient in accordance with the zoom position or zoom amount of the zoom optical system 110 from the register 302 based on the information generated by the zoom information generating means constituted by the zoom information detection device 500.

Then, the converting means constituted by the convolution device 301 converts the image signal according to the conversion coefficient selected at the coefficient selecting means constituted by the image processing processor 303.

Alternatively, as explained before, the conversion coefficient operation means constituted by the image processing processor 303 processes the conversion coefficient based on the information generated by the zoom information generating means constituted by the zoom information detection device 500 and stores the result in the register 302.

Then, the converting means constituted by the convolution device 301 converts the image signal according to the conversion coefficient obtained in the conversion coefficient operation means constituted by the image processing processor 303 and stored in the register 302.

Alternatively, the correction value storing means constituted by the register 302 stores in advance at least one correction value in accordance with the zoom position or zoom amount of the zoom optical system 110. This correction value includes the kernel size of the object aberration image.

The register 302 functioning also as the second conversion coefficient storing means stores in advance a conversion coefficient corresponding to the aberration due to the phase plate 113a.

Then, based on the zoom information generated by the zoom information generating means constituted by the zoom information detection device 500, the correction value selecting means constituted by the image processing processor 303 selects the correction value in accordance with the zoom position or zoom amount from the correction value storing means constituted by the register 302.

The converting means constituted by the convolution device 301 converts the image signal based on the conversion coefficient obtained from the second conversion coefficient storing means constituted by the register 302 and the correction value selected by the correction value selecting means constituted by the image processing processor 303.

Figure 29:
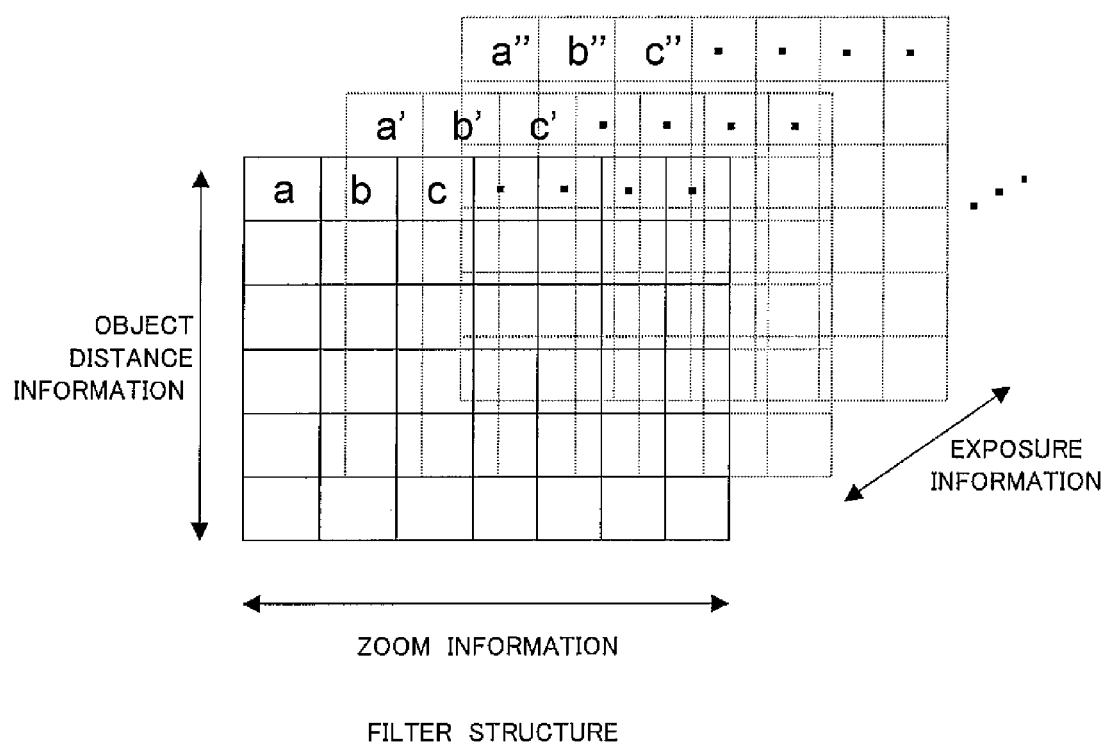
FIG. 29 is a diagram showing an example of the configuration of a filter in a case where the exposure information, object distance information, and zoom information are used.

FIG. 29 shows an example of the configuration of a filter in the case of using the exposure information, object distance information, and zoom information.

In this example, the object distance information and zoom information form two-dimensional information, and the exposure information forms depth-like information.

Figure 30:
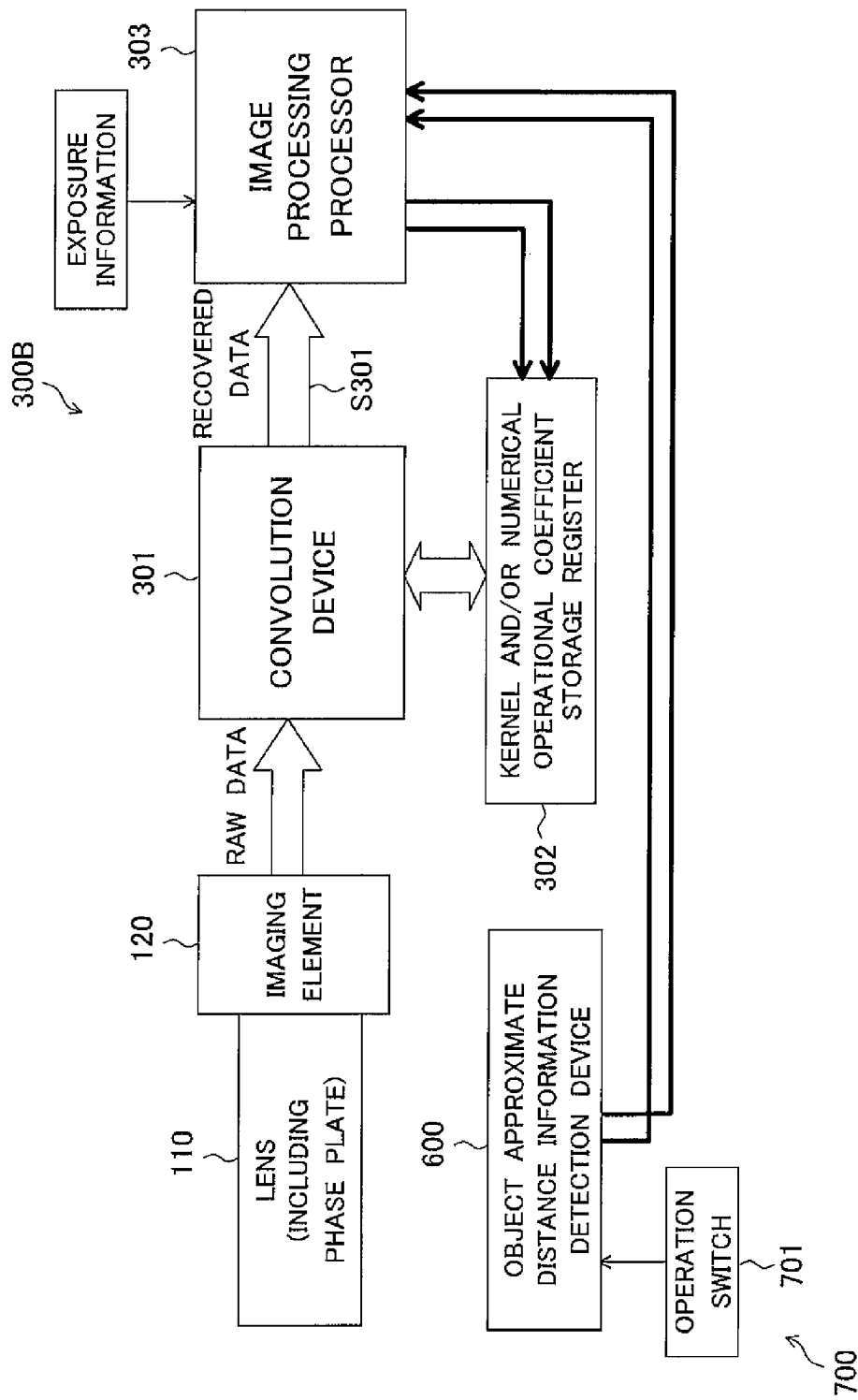
FIG. 30 is a diagram showing an example of the configuration of an image processing apparatus combining image capturing mode information and exposure information.

FIG. 30 is a diagram showing an example of the configuration of an image processing device combining image capturing mode information and exposure information.

FIG. 30 shows an example of the configuration of an image processing device 300B generating a dispersion-free image signal from a dispersed image signal of an object from the imaging element 120.

The image processing device 300B, in the same way as FIG. 27 and FIG. 28, as shown in FIG. 30, has a convolution device 301, a storing means constituted by a kernel and/or numerical operational coefficient storage register 302, and an image processing processor 303.

In this image processing device 300B, the image processing processor 303 obtains information concerning an approximate distance of an object distance of an object read out from an object approximate distance information detection device 600 and the exposure information. It stores the kernel size and its operational coefficients used in suitable operation for the object distance position in the kernel and/or numerical operational coefficient storage register 302 and performs the suitable operation to restore the image at the convolution device 301 performing operation using those values.

In this case as well, as explained above, in the case of an imaging device having a phase plate (wavefront coding optical element) as an optical wavefront modulation element, if within a predetermined focal distance range, a suitable aberration-free image signal can be generated by image processing concerning that range, but if out of the predetermined focal length range, there is a limit to the correction of the image processing, therefore only an object out of the above range ends up becoming an image signal with aberration.

Further, on the other hand, by applying image processing not causing aberration within a predetermined narrow range, it also becomes possible to give blurriness to an image out of the predetermined narrow range.

The present example is configured so as to detect the distance up to the main object by the object approximate distance information detection device 600 including a distance detection sensor and perform processing for image correction different in accordance with the detected distance.

The above image processing is carried out by a convolution operation. In order to realize this, it is possible to employ a configuration commonly storing one type of operational coefficient of the convolution operation, storing in advance a correction coefficient in accordance with the object distance, correcting the operational coefficient by using this correction coefficient, and performing a suitable convolution operation by the corrected operational coefficient, a configuration storing in advance an operational coefficient in accordance with the object distance as a function, finding the operational coefficient by this function according to the focal length, and performing a convolution operation by the computed operational coefficient, a configuration storing in advance the kernel size and the operational coefficient itself of the convolution in accordance with the object distance and performing a convolution operation by these stored kernel size and operational coefficient, and so on.

In the present embodiment, as explained above, the image processing is changed in accordance with the mode setting of the DSC (portrait, infinitely distant (scenery), and macro).

When linking this with the configuration of FIG. 30, the following configuration can be employed.

As explained before, a conversion coefficient differing in accordance with each image capturing mode set by the image capturing mode setting unit 700 of the operating unit 190 through the conversion coefficient operation means constituted by the image processing processor 303 is stored in the conversion coefficient storing means constituted by the register 302.

The image processing processor 303 extracts the conversion coefficient from the conversion coefficient storing means constituted by the register 302 based on the information generated by the object distance information generating means constituted by the object approximate distance information detection device 600 in accordance with the image capturing mode set by the operation switch 701 of the image capturing mode setting unit 700. At this time, for example the image processing processor 303 functions as a conversion coefficient extracting means.

Further, the converting means constituted by the convolution device 301 performs the conversion processing in accordance with the image capturing mode of the image signal according to the conversion coefficient stored in the register 302.

Note that the optical systems of FIG. 5 and FIG. 6 are just examples. The present invention is not always used for the optical systems of FIG. 5 and FIG. 6. Further, for the spot shape as well, FIG. 7 and FIG. 8 are just examples. The spot shape of the present embodiment is not limited to those shown in FIG. 7 and FIG. 8.

Further, the kernel data storage ROM of FIG. 19, FIG. 20, and FIG. 21 is not always used for the optical magnification, F number, size of each kernel, and its value. Further, the number of prepared kernel data is not limited to three either.

The storage amount becomes larger by employing three dimensions or further four dimensions as shown in FIG. 29, but it becomes possible to consider various conditions and select more suitable ones. The above information may also be the above exposure information, object distance information, zoom information, image capturing mode information, etc.

Note that, as explained above, in the case of an imaging device having a phase plate (wavefront coding optical element) as the optical wavefront modulation element, if within the predetermined focal distance range, a suitable aberration-free image signal can be generated by the image processing concerning that range, but if out of the predetermined focal length range, there is a limit to the correction of the image processing, therefore only an object out of the above range ends up becoming an image signal with aberration.

Further, on the other hand, by applying image processing not causing aberration within a predetermined narrow range, it also becomes possible to give blurriness to an image out of the predetermined narrow range.

As explained above, according to the present embodiment, the devices includes the optical system 110 and imaging element 120 forming the first order image and the image processing device 150 forming the first order image to a high definition final image. The control device 200 controls the switching unit 140 so as to input the dispersed image signal of the object captured by the imaging element 120 via the AFE 130 to the image processing device 150 and input the dispersion-free restored image signal to the camera signal processing unit 160 when not closing the stop down to the predetermined value, while directly input the dispersed image signal of the object captured by the imaging element 120 via the AFE 130 to the camera signal processing unit 160 without passing it through the image processing device 150 when closing the stop down to the predetermined value or more. Therefore, there are the advantages that the optical system can be simplified, the costs can be reduced, and in addition a restored image of a suitable quality in accordance with the stop control and having little influence of noise can be obtained.

Further, by making the kernel size used at the time of the convolution operation and the coefficient used in the operation of the numerical value thereof variable and linking the kernel size which is learned by the input of the operating unit 190 etc. and becomes suitable with the above coefficient, there are the advantages that the lens can be designed without worrying about the magnification and defocus range, and image restoration by high precision convolution becomes possible.

Further, there is the advantage that a so-called natural image where the image to be captured is in focus, but the background is blurred can be obtained without requiring optical lenses having a high difficulty, expensive cost, and large size and without driving the lenses.

Furthermore, the imaging device 100 according to the present embodiment can be used for the DEOS of a zoom lens designed considering small size, light weight, and cost in a digital camera, camcorder, or other consumer electronic device.

Further, in the present embodiment, since the device has an imaging lens system having a wavefront forming optical element for deforming the wavefront of the image formed on a light receiving surface of the imaging element 120 by the imaging lens 112 and has the image processing device 150 for receiving the first order image FIM by the imaging element 120 and applying predetermined correction processing etc. to boost the MTF at the spatial frequency of the first order image and form the high definition final image FNLIM, there is the advantage that the acquisition of a high definition image quality becomes possible.

Further, the configuration of the optical system 110 can be simplified, production becomes easy, and costs can be reduced.

When using a CCD or CMOS sensor as the imaging element, there is a resolution limit determined from the pixel pitch. When the resolution of the optical system is over that limit resolution power, the phenomenon of aliasing is generated and exerts an adverse influence upon the final image. This is a known fact.

For the improvement of the image quality, desirably the contrast is raised as much as possible, but this requires a high performance lens system.

However, as explained above, when using a CCD or CMOS sensor as the imaging element, aliasing occurs.

At present, in order to avoid the occurrence of aliasing, the imaging lens system jointly uses a low pass filter made of a uniaxial crystal system together to thereby avoid the phenomenon of aliasing.

The joint usage of the low pass filter in this way is correct in terms of principle, but a low pass filter per se is made of crystal, therefore is expensive and hard to manage. Further, there is the disadvantage that the optical system becomes more complicated due to the use in the optical system.

As described above, a higher definition image quality is demanded as a trend of the times. In order to form a high definition image, the optical system in a conventional imaging lens device must be made more complicated. If it is complicated, production becomes difficult. Also, the utilization of the expensive low pass filters leads to an increase in the cost.

However, according to the present embodiment, the occurrence of the phenomenon of aliasing can be avoided without using a low pass filter and a high definition image quality can be obtained.

Note that, in the present embodiment, the example of arranging the wavefront forming optical element of the optical system on the object side from the stop was shown, but functional effects the same as those described above can be obtained even by arranging the wavefront forming optical element at a position the same as the position of the stop or on the focus lens side from the stop.

Note that the optical systems of FIG. 5 and FIG. 6 are just examples. The present invention is not necessarily used for the optical systems of FIG. 5 and FIG. 6. Further, for the spot shape as well, FIG. 7 and FIG. 8 are just examples. The spot shape of the present embodiment is not limited to those shown in FIG. 5 and FIG. 6.

Further, the kernel data storage ROM of FIG. 19, FIG. 20, and FIG. 21 is not always used for the optical magnification, F number, size of each kernel, and its value. Further, the number of prepared kernel data is not limited to three either.

INDUSTRIAL APPLICABILITY

According to the present invention, the optical system can be simplified, the costs can be reduced, and, in addition it is possible to obtain a restored image with suitable quality according to the stop control and little influence of noise, therefore the present invention can be applied to a digital still camera, a camera mounted in a mobile phone, a camera mounted in a digital personal assistant, an image checking device, an automatic control use industrial camera, and so on.

The invention claimed is:

1. An imaging device comprising:
    an optical system,
    an optical wavefront modulation element modulating an optical transfer function (OTF),
    a variable stop,
    an imaging element capturing an object image passed through the optical system, the variable stop, and the optical wavefront modulation element,
    a converting means for generating a dispersion-free image signal from a dispersed image signal of the object from the imaging element,
    a signal processing unit performing predetermined processing on the image signal, a memory means for storing operation coefficients of the signal processing unit, and a control means for controlling the stop, wherein the control means, when not closing the stop down to a predetermined value, inputs the dispersed image signal of the object from the imaging element to the converting means and inputs the dispersion-free image signal to the signal processing unit and, when closing the stop down to the predetermined value or more, inputs the dispersed image signal of the object from the imaging element to the signal processing unit without passing through the converting means.

2. An imaging device as set forth in claim 1, wherein the optical wavefront modulation element has the action of making the change of the OTF in accordance with the object distance smaller than that of an optical system not having an optical wavefront modulation element.

3. An imaging device as set forth in claim 1, wherein the OTF of the optical system having the optical wavefront modulation element is 0.1 or more up to the Nyquist frequency of the imaging element over an object distance broader than the depth of the field of the object of an optical system not including an optical wavefront modulation element.

4. An imaging device as set forth in claim 1, wherein, in the optical wavefront modulation element, the phase is represented by the following equation where an optical axis of the optical system is a z-axis, and two axes perpendicular to each other are x and y $$z = \exp\left\{i \times \left(\sum_{j=1} C_j x^m y^n\right)\right\}$$ [Equation 1]

where, n and m are integers, $j=[(m+n)2+m+3n]/2$, $|x|\leq 1$, and $|y|\leq 1$.

5. An imaging device as set forth in claim 1, wherein the signal processing unit has a means for applying noise reduction filtering.

6. An imaging device as set forth in claim 1, wherein the memory means stores operation coefficients for the optical transfer function (OTF) restoration in accordance with the exposure information.

7. An imaging device as set forth in claim 1, wherein the memory means stores operation coefficients for the noise reduction processing in accordance with the exposure information.

8. An imaging device as set forth in claim 7, wherein, as the exposure information, stop information is included.

9. An imaging device as set forth in claim 1, wherein, in the imaging device, the optical system includes a zoom optical system, and the device comprises a correction value storing means for storing in advance at least one or more correction values in accordance with the zoom position or zoom amount of the zoom optical system, a second conversion coefficient storing means for storing in advance at least the conversion coefficient corresponding to the dispersion caused by the optical wavefront modulation element or the optical system, and a correction value selecting means for selecting the correction value in accordance with the distance up to the object from the correction value storing means based on the information generated by the object distance information generating means, and the converting means converts the image signal according to the conversion coefficient obtained from the second conversion coefficient storing means and the correction value selected from the correction value selecting means.

10. An imaging device as set forth in claim 9, wherein the correction value stored by the correction value storing means includes a kernel size of the dispersed image of the object.

11. An imaging device as set forth in claim 1, wherein the imaging device comprises an object distance information generating means for generating information corresponding to the distance up to the object, and the converting means generates a dispersion-free image signal from the dispersed signal of the object based on the information generated by the object distance information generating means.

12. An imaging device as set forth in claim 11, wherein the imaging device comprises a conversion coefficient storing means for storing at least two or more conversion coefficients corresponding to the dispersion caused by the optical wavefront modulation element or the optical system in accordance with the object distance and a coefficient selecting means for selecting the conversion coefficient in accordance with the distance up to the object from the conversion coefficient storing means based on the information generated by the object distance information generating means, and the converting means converts the image signal according to the conversion coefficient selected at the coefficient selecting means.

13. An imaging device as set forth in claim 11, wherein the imaging device comprises a conversion coefficient operation means for performing operation of the conversion coefficient based on the information generated by the object distance information generating means, and the converting means converts the image signal according to the conversion coefficient obtained from the conversion coefficient operation means.

14. An imaging device as set forth in claim 1, wherein the imaging device is provided with an object distance information generating means for generating the information corresponding to the distance up to the object and a conversion coefficient operation means for performing operation of the conversion coefficient based on the information generated by the object distance information generating means, and the converting means converts the image signal and generates a dispersion-free image signal based on the conversion coefficient obtained from the conversion coefficient operation means.

15. An imaging device as set forth in claim 14, wherein the conversion coefficient operation means includes a kernel size of the dispersed image of the object as a variable.

16. An imaging device as set forth in claim 14, wherein the device has a storing means, the conversion coefficient operation means stores the found conversion coefficient in the storing means, and the converting means converts the image signal and generates a dispersion-free image signal according to the conversion coefficient stored in the storing means.

17. An imaging device as set forth in claim 14, wherein the converting means performs a convolution operation based on the conversion coefficient.

18. An imaging device as set forth in claim 1, wherein the imaging device comprises an image capturing mode setting means for setting an image capturing mode of the object to be captured, and the converting means performs different conversion processing in accordance with the image capturing mode set by the image capturing mode setting means.

19. An imaging device as set forth in claim 18, wherein the image capturing mode includes, other than a normal image capturing mode, at least one of a macro image capturing mode or a distant view image capturing mode, when the image capturing mode includes the macro image capturing mode, the converting means selectively executes normal conversion processing in the normal image capturing mode and macro conversion processing for reducing dispersion at a proximate side in comparison with the normal conversion processing in accordance with the image capturing mode, and when the image capturing mode includes the distant view image capturing mode, the converting means selectively executes normal conversion processing in the normal image capturing mode and distant view conversion processing for reducing dispersion at a distant side in comparison with the normal conversion processing in accordance with the image capturing mode.

20. An imaging device as set forth in claim 18, wherein the image capturing mode setting means includes an operation switch for inputting the image capturing mode and an object distance information generating means for generating information corresponding to a distance up to the object according to the input information of the operation switch, and the converting means converts a dispersed image signal to a dispersion-free image signal based on the information generated by the object distance information generating means.

21. An imaging device as set forth in claim 18, wherein the device comprises a conversion coefficient storing means for storing a different conversion coefficient in accordance with each image capturing mode set by the image capturing mode setting means and a conversion coefficient extracting means for extracting a conversion coefficient from the conversion coefficient storing means in accordance with the image capturing mode set by the image capturing mode setting means, and the converting means converts the image signal according to the conversion coefficient obtained from the conversion coefficient extracting means.

22. An imaging device as set forth in claim 21, wherein the conversion coefficient storing means includes the kernel size of the dispersed image of the object as the conversion coefficient.

23. An image processing method of an imaging device having an optical system, a variable stop, and an imaging element for capturing an object image passed through the optical wavefront modulation element, comprising the steps of, when not closing the stop down to a predetermined value, generating a dispersion-free image signal from a dispersed image signal of the object from the imaging element and performing predetermined signal processing with respect to the dispersion-free image signal and, when closing the stop down to the predetermined value or more, performing predetermined signal processing with respect to the dispersed image signal of the object from the imaging element.

* * * * *